(12) United States Patent
Kruglick et al.

(10) Patent No.: US 12,262,727 B2
(45) Date of Patent: Apr. 1, 2025

(54) SYSTEMS TO FABRICATE FOOD AGGREGATE FROM FOOD ELEMENTS AND RELATED METHODS

(71) Applicant: XINOVA, LLC, Seattle, WA (US)

(72) Inventors: Ezekiel Kruglick, Poway, CA (US); Benjamin William Millar, New South Wales (AU)

(73) Assignee: The Quaker Oats Company, Chicago, IL (US)

( * ) Notice: Subject to any disclaimer, the term of this patent is extended or adjusted under 35 U.S.C. 154(b) by 929 days.

(21) Appl. No.: 17/415,058

(22) PCT Filed: Dec. 18, 2018

(86) PCT No.: PCT/US2018/066189
§ 371 (c)(1),
(2) Date: Jun. 17, 2021

(87) PCT Pub. No.: WO2020/131028
PCT Pub. Date: Jun. 25, 2020

(65) Prior Publication Data
US 2022/0061374 A1  Mar. 3, 2022

(51) Int. Cl.
*A23P 10/28* (2016.01)
*A23P 30/10* (2016.01)
*B30B 15/00* (2006.01)
*B30B 15/26* (2006.01)

(52) U.S. Cl.
CPC .............. *A23P 10/28* (2016.08); *A23P 30/10* (2016.08); *B30B 15/0052* (2013.01); *B30B 15/26* (2013.01)

(58) Field of Classification Search
None
See application file for complete search history.

(56) References Cited

U.S. PATENT DOCUMENTS

| | | | |
|---|---|---|---|
| 3,463,641 A | 8/1969 | Berardi et al. | |
| 3,912,433 A | 10/1975 | Ma | |
| 5,306,460 A | 4/1994 | Hidawa et al. | |
| 9,750,269 B2 * | 9/2017 | Mastroianni | A23L 7/183 |

FOREIGN PATENT DOCUMENTS

| | | |
|---|---|---|
| CN | 203485442 U | 3/2014 |
| CN | 103689776 | 4/2014 |
| CN | 105455122 | 4/2016 |
| CN | 207710919 U | 8/2018 |
| EP | 0052728 | 6/1982 |
| GB | 1171024 | 11/1969 |
| KR | 20180033657 | 4/2018 |
| WO | 2016/107652 | 7/2016 |

OTHER PUBLICATIONS

International Preliminary Report issued on Jul. 1, 2021 in Application No. PCT/US2018/066189.
International Search Report issued on Sep. 11, 2019 in Application No. PCT/US2018/066189.
Written Opinion issued on Sep. 11, 2019 in Application No. PCT/US2018/066189.
Office action issued on Mar. 10, 2022 in Chinese Application No. 2018801007184.
Examination Report issued in Appl. No. 18830691.4 on Dec. 3, 2024.

* cited by examiner

*Primary Examiner* — Jyoti Chawla
(74) *Attorney, Agent, or Firm* — Barnes & Thornburg LLP; G. Peter Nichols

(57) ABSTRACT

Techniques described include methods, systems, products, devices, and/or apparatuses related to food processing systems related methods, and food items produced therewith. For example, the food processing system may be configured to fabricate food aggregates from multiple food elements. The food processing system includes a first press body and a second press body. The second press body is positioned and oriented opposite to the first press body and reconfigurable from a first configuration to a second, non-planar configuration. The second, non-planar configuration of the press body is different from the first configuration. At least one of the first or second press bodies is movable in a manner that decreases space between the first and second press bodies, to compress the food elements and form the food aggregate. A dispenser of the food elements is positioned and configured to dispense the food elements between the first and second press bodies.

25 Claims, 17 Drawing Sheets

500 A computer program product

502 A signal bearing medium

504 Programming instructions to
- Direct a press body, such that the first press surface presses against the food elements in a manner that reconfigures the first press surface to conform one or more shapes of the food elements contacting the first press surface
- Direct increase in the stiffness of the first press surface
- Direct the press body to advance and to compress the food elements to produce the food aggregate

| 506 A computer-readable medium | 508 A recordable medium | 510 A communications medium |

*FIG. 7*

SYSTEMS TO FABRICATE FOOD AGGREGATE FROM FOOD ELEMENTS AND RELATED METHODS

This application is a U.S. National Phase Application of PCT Application No. PCT/US2018/066189 filed on Dec. 18, 2017, the entire contents of which is incorporated herein by reference.

BACKGROUND

The present disclosure relates to systems and methods to fabricate a food aggregate from food elements, for example, a conformal press system for binding the food elements under pressure.

Various food elements may be combined or aggregated together to form a combined or aggregated, single food item. For example, oatmeal, nuts, seeds, grains, berries, etc., may be positioned adjacent to one another, such that the food elements are held together as a single food unit. Such food items or units may be shaped as bars for convenience consumption by users.

Generally, the amount of binding agent(s) used to form the food aggregates can be reduced by applying pressure. Applied pressure during bar formation increases the binding strength between food elements by increasing the surface contact, interface forces, and mechanical interlocking. By increasing surface contact, food elements are forced closer together and smaller amounts of binding agents are required to promote binding. Further, by increasing interface forces, more liquid bridges of binding agents can form easily and promote mechanical interlocking.

However, pressure is not always a viable technique for increased binding of food aggregates. Using a mold or flat press to combine "whole" ingredients (e.g., nuts, grains, seeds, dried fruits, etc.) results in force concentrations on the largest (i.e., tallest) components. Binding these "whole" ingredients with existing press shapes and pressures results in crushed or shattered food aggregate pieces that appear damaged or destroyed.

Accordingly, users and manufacturers of food items made from multiple food elements continue to seek improvements thereto.

BRIEF SUMMARY

Techniques are generally described that include methods, systems, products, devices, and/or apparatuses generally related to food processing systems, related methods, and food items produced therewith. For example, the food processing system may be configured to fabricate food aggregates from multiple food elements. Generally, the system may compress together multiple food elements in a manner that forms a single, aggregate food item or unit (e.g., such that the food elements are held together). Moreover, in some examples, the system may minimize crushing or otherwise damaging the food elements included in the food item.

Examples include a system to fabricate food aggregate from food elements. The system includes a first press surface and a second press surface positioned and oriented opposite to the first press surface. In some examples, the second press surface is reconfigurable from a first configuration to a second, non-planar configuration. Moreover, the second, non-planar configuration of the press surface may be different from the first configuration, and at least one of the first press surface or the second press surface is movable in a manner that decreases space between the first press surface and second press surface, to compress the food elements and form the food aggregate. Moreover, the system includes a dispenser of the food elements positioned and configured to dispense the food elements between the first press surface and the second press surface.

Examples also include a system to fabricate food aggregate from food elements. The system includes a plurality of compression cells including a plurality of walls that partially define a plurality of compression spaces, and one or more first press surfaces positioned within at least one compression space of the plurality of compression spaces. Furthermore, the system includes one or more second press surfaces positioned and oriented opposite to at least one first press surface of the one or more first press surfaces. The one or more second press surfaces are movable toward corresponding ones of the at least one first press surface. At least one of the one or more first press surfaces or the one or more second press surfaces is reconfigurable from a first configuration to a second, non-planar configuration that is different from the first configuration. Also, in at least one non-limiting embodiment, the system includes a dispenser of the food elements positioned and configured to dispense the food elements into at least one compression space of the plurality of compression spaces.

Examples include a method to fabricate food aggregate from food elements of one or more shapes. The method includes positioning food elements between a first press surface and a second press surface, pressing the press surfaces against the food elements in a manner that reconfigures at least one of the press surfaces to contour (e.g., conform to) one or more shapes of the food elements contacting the press surface, optionally increasing the stiffness of the press surface, and compressing the food elements to produce the food aggregate.

In some embodiments, a system to fabricate a food aggregate from food elements includes a first press body and a second press body positioned and oriented opposite to the first press body. In some embodiments, the second press body is reconfigurable from a first configuration to a second, non-planar configuration. In some embodiments, the second, non-planar configuration of the second press body is different from the first configuration. In some embodiments, at least one of the first press body or the second press body is configured to compress the food elements and form the food aggregate.

In some embodiments, the system further includes a dispenser of the food elements positioned and configured to dispense the food elements between the first press body and the second press body. In some embodiments, the second press body is reconfigurable from the first configuration to the second, non-planar configuration responsive to pressure applied thereon by the food elements. In some embodiments, the system further includes at least one wall that defines a compression space, and at least one of the first press body or the second press body is movable inside the compression space. In some embodiments, the first press body and the second press body at least partially define the compression space. In some embodiments, the dispenser is positioned and configured to dispense the food elements into the compression space.

In some embodiments, the system further includes a container having an outer surface and a pressure regulator operably coupled to the container and configured to selectively reduce or increase pressure in the container. In some embodiments, at least a portion of the outer surface of the container defines the second press body. In some embodiments, the system further includes a vacuum source operably coupled to the pressure regulator. In some embodiments, the system further includes a particulate medium disposed in the container. In some embodiments, the container includes at least one flexible wall that defines at least the second press body. In some embodiments, the system further includes a piston operably connected to the first press body or to the second press body and movable in a manner that decreases space between the first press body and second press body.

In some embodiments, the system further includes a controller operably coupled to the piston and to the pressure regulator. In some embodiments, the controller is configured to direct movement of the piston in a manner that decreases separation between the first press body and the second press body, thereby reconfiguring the second press body from the first configuration to the second, non-planar configuration responsive to a first pressure applied by the second press body and the first press body on the food elements therebetween. In some embodiments, the controller is configured to, after movement of the piston, direct the pressure regulator to reduce pressure in the container. In some embodiments, the controller is configured to direct the piston to produce a second pressure applied by the first press body and the second press body on the food elements therebetween, the second pressure being greater than the first pressure.

In some embodiments, the second, non-planar configuration is complementary to the food elements. In some embodiments, the first press body is reconfigurable from a first configuration to a second, non-planar configuration, and the second, non-planar configuration of the press body is different from the first configuration.

In some embodiments, a system to fabricate a food aggregate from food elements includes a plurality of compression cells including a plurality of walls that partially define a plurality of compression spaces, one or more first press bodies positioned within at least one compression space of the plurality of compression spaces, and one or more second press bodies positioned and oriented opposite to at least one first press body of the one or more first press bodies. In some embodiments, the one or more second press bodies are configured to compress the food elements and form the food aggregate. In some embodiments, at least one of the one or more first press bodies or the one or more second press bodies is reconfigurable from a first configuration to a second, non-planar configuration that is different from the first configuration.

In some embodiments, the system further includes a dispenser of the food elements positioned and configured to dispense the food elements into at least one compression space of the plurality of compression spaces. In some embodiments, the compression cells have a radial arrangement relative to one another. In some embodiments, the compression cells have a linear arrangement relative to one another. In some embodiments, the second press body is reconfigurable from the first configuration to the second, non-planar configuration responsive to pressure applied thereon by the food elements. In some embodiments, the second, non-planar configuration is complementary to the food elements. In some embodiments, the dispenser is positioned and configured to dispense the food elements into two or more compression spaces.

In some embodiments, the system further includes one or more containers, each including an outer surface at least a portion of which defines at least one of the one or more first press bodies or one or more second press bodies, and one or more pressure regulators operably coupled to the one or more containers and configured to selectively reduce or increase the pressure in the one or more containers. In some embodiments, the system further includes one or more vacuum sources operably coupled to the one or more pressure regulators. In some embodiments, the system further includes a particulate medium disposed in the one or more containers. In some embodiments, each container of the plurality of containers includes at least one flexible wall that defines at least one of the one or more first press bodies or one or more second press bodies. In some embodiments, the system further includes a piston operably connected to the first press body and movable in a manner that decreases space between the first press body and the second press body.

In some embodiments, the system further includes a controller operably coupled to the piston and to the pressure regulator. In some embodiments, the controller is configured to direct movement of the piston in a manner that decreases space between at least one of the one or more first press bodies and at least one of the one or more second press bodies to a first distance, thereby reconfiguring one or more of the at least one first press body or at least one second press body from the first configuration to the second, non-planar configuration responsive to a first pressure applied by the at least one first press body and the at least one second press body on the food elements therebetween, and after movement of the piston, direct the one or more pressure regulators to reduce pressure in at least one container of the one or more containers. In some embodiments, the first press body is reconfigurable from a first configuration to a second, non-planar configuration, and the second, non-planar configuration of the press body is different from the first configuration.

In some embodiments, a method to fabricate a food aggregate from food elements of one or more shapes includes positioning food elements between a first press body and a second press body, pressing the first press body against the food elements in a manner that reconfigures the first press body to conform to one or more shapes of the food elements contacting the first press body, increasing the stiffness of the first press body, and compressing the food elements to produce the food aggregate.

In some embodiments, pressing the first press body against the food elements in a manner that reconfigures the first press body to conform to one or more shapes of the food elements includes contacting the first press body to produce a first pressure on the food elements. In some embodiments, compressing the food elements to produce the food aggregate includes pressing the reconfigured press body against the food elements to produce a second pressure on the food elements. In some embodiments, the second pressure is greater than the first pressure. In some embodiments, the first press body is defined by a container that includes a particulate medium. In some embodiments, increasing the stiffness of the first press body includes reducing the pressure in the container.

In some embodiments, the method further includes pressing the second press body against the food elements in a manner that reconfigures the second press body to conform to the one or more shapes of the food elements contacting the second press body, and increasing the stiffness of the second press body. In some embodiments, pressing the first press body against the food elements in the manner that reconfigures the first press body to conform to the one or more shapes of the food elements contacting the first press body includes moving at least one of the first press body and the second press body in a manner that reduces a distance therebetween. In some embodiments, the method further includes decreasing the stiffness of the first press body after compressing the food elements to produce the food aggregate.

In some embodiments, the method can include compressing the food elements by applying a pressure of about 150 kPa to about 800 kPa to produce the food aggregate. In some embodiments, the pressure is about 500 kPa to about 700 kPa. In some embodiments, the method can further include adding a binder having about 5 wt % to about 25 wt % to the food elements to produce the food aggregate. In some embodiments, the binder can include about 10 wt % to about 15 wt %. In some embodiments, the food aggregate has an ultimate flexural stress of about 50 kPa to about 200 kPa. In some embodiments, the food aggregate has an ultimate flexural stress of about 120 kPa to about 180 kPa. In some embodiments, the food aggregate has an ultimate flexural stress of about 140 kPa to about 160 kPa.

In some embodiments, the second press body includes a material having a density gradient. In some embodiments, the material is foam rubber. In some embodiments, the second press body includes a first layer having a first density and a second layer having a second density. In some embodiments, the first layer is disposed between the food elements and the second layer. In some embodiments, the second density is higher than the first density. In some embodiments, the second press body includes a third layer having a third density. In some embodiments, the second layer is disposed between the first layer and the third layer. In some embodiments, the second density is higher than the first density and the third density is higher than the second density.

In some embodiments, the at least one or more first press bodies or the one or more second press bodies include a material having a density gradient. In some embodiments, the density increases along an axis substantially perpendicular to and extending away from the food elements.

Features from any of the disclosed embodiments may be used in combination with one another, without limitation. In addition, other features and advantages of the present disclosure will become apparent to those of ordinary skill in the art through consideration of the following detailed description and the accompanying drawings.

The foregoing summary is illustrative only and is not intended to be in any way limiting. In addition to the illustrative aspects, embodiments, and features described above, further aspects, embodiments, and features will become apparent by reference to the drawings and the following detailed description.

Further features and advantages of the embodiments described herein, as well as the structure and operation of various embodiments, are described in detail below with reference to the accompanying drawings. It is noted that the embodiments are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several examples in accordance with the disclosure and are, therefore, not to be considered limiting of its scope, the disclosure will be described with additional specificity and detail through use of the accompanying drawings. The accompanying drawings, which are incorporated herein and form part of the specification, illustrate embodiments and, together with the description, further serve to explain the principles of the embodiments and to enable a person skilled in the relevant art(s) to make and use the embodiments. Embodiments will now be described, by way of example only, with reference to the accompanying schematic drawings, in which:

FIG. 7 is a block diagram illustrating an example computer program product that is arranged to store instructions for controlling any of the systems disclosed herein, according to an embodiment.

Figure 1A:
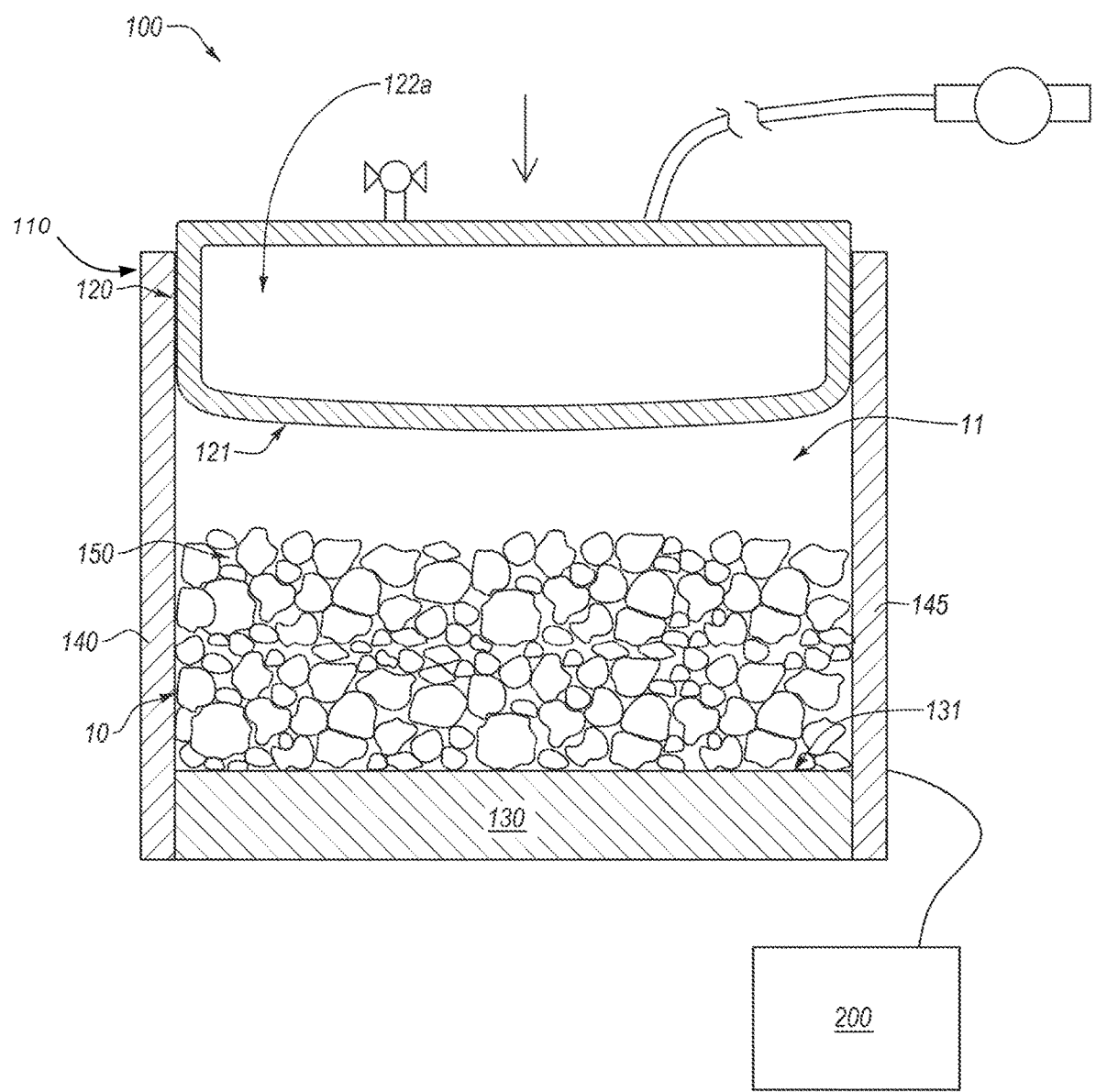
FIG. 1A is a schematic, cross-sectional view of a food-processing cell with press surfaces at a first distance therebetween, according to an embodiment.

The features and advantages of the present embodiments will become more apparent from the detailed description set forth below when taken in conjunction with the drawings, in which like reference numbers identify corresponding elements throughout. In the drawings, like reference numbers generally indicate identical, functionally similar, and/or structurally similar elements. Additionally, generally, the left-most digit(s) of a reference number identifies the drawing in which the reference number first appears. Unless otherwise indicated, the drawings provided throughout the disclosure should not be interpreted as to-scale drawings.

DETAILED DESCRIPTION

The embodiment(s) described, and references in the specification to "one embodiment," "an embodiment," "an example embodiment," etc., indicate that the embodiment(s) described may include a particular feature, structure, or characteristic, but every embodiment may not necessarily include the particular feature, structure, or characteristic. Further, when a particular feature, structure, or characteristic is described in connection with an embodiment, it is understood that it is within the knowledge of one skilled in the art to effect such feature, structure, or characteristic in connection with other embodiments whether or not explicitly described.

Spatially relative terms, such as "beneath," "below," "lower," "above," "on," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus and/or system may be otherwise oriented (rotated 90 degrees or at other orientations) and the spatially relative descriptors used herein may likewise be interpreted accordingly.

The term "about" as used herein indicates the value of a given quantity that can vary based on a particular technology. Based on the particular technology, the term "about" can indicate a value of a given quantity that varies within, for example, 10-30% of the value (e.g., ±10%, ±20%, or ±30% of the value).

The term "substantially" as used herein indicates the value of a given quantity that can vary based on a particular technology. Based on the particular technology, the term "substantially" can indicate a value of a given quantity that varies within, for example, 0-10% of the value (e.g., ±1%, ±2%, or ±10% of the value).

In the following detailed description, reference is made to the accompanying drawings, which form a part hereof. In the drawings, similar symbols typically identify similar components, unless context dictates otherwise. The illustrative examples described in the detailed description, drawings, and claims are not meant to be limiting. Other examples may be utilized, and other changes may be made, without departing from the spirit or scope of the subject matter presented herein. It will be readily understood that the aspects of the present disclosure, as generally described herein, and illustrated in the Figures, may be arranged, substituted, combined, separated, and designed in a wide variety of different configurations, all of which are implicitly contemplated herein.

Techniques are generally described that include methods, systems, products, devices, and/or apparatuses generally related to food processing systems, related methods, and food items produced therewith. For example, the food processing system may be configured to fabricate food aggregates from multiple food elements. Generally, the system may compress together multiple food elements in a manner that forms a single, aggregate food item or unit (e.g., such that the food elements are held together). Moreover, in some examples, the system may minimize crushing or otherwise damaging the food elements included in the food item.

In at least one example, the food processing system may include two opposing press surfaces that may compress together the food elements. The system may bring the press surfaces closer together (e.g., by advancing at least one of the press surfaces toward the other), thereby compressing together the food elements. Moreover, at least one of the press surfaces may be at least partially conformable to at least one or some of the food elements in contact therewith (e.g., such that the surface forms complementary shape(s) with the contacting food element(s)). For example, conforming the press surface to the food element(s) may provide a more evenly distributed pressure thereon during compression of the food elements (e.g., compared with a press surface that does not have complementary shape(s) with the food element(s)). Furthermore, producing a more evenly distributed pressure may reduce the damage to or destruction of the food elements during compression thereof.

Generally, the food-processing system may be operated continuously, such as to produce new food item from multiple food elements. That is, after a food element is produced, a new batch of food elements may be introduced between the opposing press surfaces to produce a new food element (e.g., after a first batch is processed or compressed together, a new, second batch may be introduced for compression to form another food item). The conformable press surface may be conformed to the shapes of food elements in each batch (e.g., such that at least portions of the press surface contour or complement the shapes of the food element in contact therewith). For example, the press surface may be conformed to the shapes of at least some of the food elements in the first batch and may be subsequently reconfigured to conform to the shapes of at least some of the food elements in the second batch, and so on.

For example, the conformable press surface may be included on a press body that may be reshaped, such that the conformable press surface conforms to the shapes of the food elements. In some examples, at least a portion of the press body may be reconfigured to be generally pliable, such that pressing the conformable press surface against the food elements reconfigures the press surface to at least partially or substantially conform to the shapes of one or more food elements. Furthermore, after the conformable press surface is reconfigured and at least partially conforms to the shapes of the food elements, the press body that includes the reconfigured press surface may be reconfigured into a stiffened state, such that the conformed press surface retains its shape during further compression of the food elements. As mentioned above, the food-processing system may continuously or cyclically process food elements. For example, the press body may be reconfigured into a pliable state after processing the first batch of food element (and producing a food item), in which the conformable press surface may be reconfigured to conform to food elements in a subsequent batch.

Various food elements may be combined or aggregated together to form a combined or aggregated, single food item. For example, oatmeal, nuts, seeds, grains, berries, etc., may be positioned adjacent to one another, such that the food elements are held together as a single food unit. Such food items or units may be shaped as bars for convenient consumption by users.

Typical food bars or snack clusters are held together with a binding agent (e.g., syrup, sugar, etc.) that adhere the individual ingredients together in a bar cluster. Generally, the bars are formed by low pressure rolling, which provides adequate compression for forming at high binder concentrations (e.g., over 30% by weight), but is insufficient for low binder concentrations (e.g., less than 30% by weight).

The amount of binding agent(s) used to form the food aggregates can be reduced by applying pressure. Applied pressure during bar formation increases the binding strength between food elements by increasing the surface contact, interface forces, and mechanical interlocking. By increasing surface contact, food elements are forced closer together and smaller amounts of binding agent(s) are required to promote binding. Further, by increasing interface forces, more liquid bridges of binding agents can form easily and promote mechanical interlocking. Increased binding strength due to compression requires a lower quantity and/or quality of binder to achieve adequate bar cohesion. High pressures required to take advantage of these binder effects will damage or destroy large food elements (e.g., nuts) when a flat rigid press is used.

Pressure is not always a viable technique for increased binding of food aggregates. Using a mold or flat press to combine "whole" ingredients (e.g., nuts, grains, seeds, dried fruits, etc.) results in force concentrations on the largest (i.e., tallest) components. Binding of these "whole" ingredients with existing press shapes and pressures results in crushed or shattered food aggregate pieces that appear damaged or destroyed and thus unappealing to the consumer. A solution is needed to enable pressure induced binding of food aggregates to reduce binding agent requirements without compromising the outer food aggregate appearance (e.g., "home made" look). A dynamically conformal compression surface can be used to increase the food element formation pressure while reducing the binding agent content.

As described herein, vacuum or granular jamming of ingredients uses a flexible outer covering placed around various small (i.e., granular) particles. The flexible covering is placed against an object and when a negative pressure is applied to the covering, the enclosed particles "jam" against one another and form a rigid surface matching the shape of the contour of the object. The vacuum jamming effect allows a press surface to transition from soft to pliable to rigid after low initial force contact with food elements. As described below, a conformal surface can be applied at higher pressures (e.g., 680 kPa) compared to a traditional flat press surface (e.g., 160 kPa). Conformal pressing preserves the "home made" look of the food elements in the formed food aggregate. Further, the binding strength between food elements can be increased, such that a lower quantity and/or quality of binding agent (e.g., sugar content can be lowered) can be used.

Using conformal compression surfaces allows for greater pressure to be applied during formation and binding of food elements into a food aggregate than a non-conformal (i.e., flat and rigid) compression surface. Non-conformal compression surfaces applied at similar high pressures results in fracture or shattering of the food aggregate. High pressure compression increases the binding strength of food aggregates at all binder ratios, for example, low binder compositions (e.g., less than 30% by weight). A rigid or flat piston head crushes and flattens food elements and must use more binding agents (e.g., sugar, syrup, etc.) to retain a textured bar surface in the formed food aggregate. A dynamic conformal press surface can flex at low pressure to conform to the shape and contour of the food elements. Upon application of a negative pressure (e.g., vacuum), the dynamic conformal press surface becomes rigid and a greater force (i.e., high pressure) can be applied to the food elements to form a food aggregate with less binding agents and less binding concentration (e.g., sugar content), while protecting the "whole" ingredients in the formed food aggregate for a "home made" look.

FIG. 1A is a schematic, cross-sectional view of a food-element processing system 100, according to at least one example. As mentioned above, the food-element processing system 100 may process or compress together multiple food elements to produce a single food unit or item therefrom. Generally, the food-element processing system 100 may include any number of food-processing cells that may compress the food elements. In the illustrated embodiment, the food-element processing system 100 includes a food-processing cell 110. In some embodiments, food-element processing cell 110 may be a compression cell, which can be configured to compress one or more objects, for example, multiple-food-element batch 10.

Specifically, in the example shown in FIG. 1A, the food-processing cell 110 includes a first press body 120 that includes a first press surface 121, and a second press body 130 that includes a second press surface 131. As described here, it will be understood that the first press body 120 may be disposed above the multiple-food-element batch 10 and the second press body 130 may be disposed below the multiple-food-element batch 10, or vice versa. Furthermore, the food-processing cell 110 may include one or more sidewalls, such as sidewalls 140, 145, that enclose the perimeter or periphery of the first press surface 121 and second press surface 131. In the illustrated example, the first press surface 121, second press surface 131, and the sidewalls 140, 145 define a compression space 150 of the food-processing cell 110. For example, multiple-food-element batch 10 may be positioned inside the compression space 150 and the food elements thereof may be compressed together by the first press body 120 and second press body 130 (e.g., between the first press surface 121 and second press surface 131).

The multiple-food-element batch 10 may include any number of suitable food elements that may vary from one example to another. Moreover, the food elements included in the multiple-food-element batch 10 may have various shapes, sizes, resilience or toughness, flavors, colors, etc., or combinations thereof. Suitable food elements include, but are not limited to, oatmeal, berries, nuts, seeds, grains, fruits, etc. Moreover, the multiple-food-element batch 10 may include one or more binders or binding agents that may secure together the various food elements of the multiple-food-element batch 10 to produce a food item or unit therefrom. The binder may vary from one example to another. Suitable binders include, but are not limited to, sugar-containing liquids and/or semi-liquids, such as honey, syrup, sugar water, glucose syrup, agave, sap, etc.

Generally, positioning adjacent food elements closer together may reduce the amount of food binder suitable or required for connecting or securing together the food elements of the multiple-food-element batch 10, to produce the food item. Pressing together the food elements with an increased amount of force applied thereto may position adjacent food elements closer together. Moreover, for example, applying an increased amount of force without crushing, damaging, or otherwise compromising the integrity of the visible food ingredients may maintain the overall aesthetic appearance of the food item (e.g., after the food elements of the multiple-food-element batch 10 are compressed together to form the food item).

Reducing the amount of binder and/or reducing crushing of the various food elements that may be provided in the multiple-food-element batch 10 may facilitate production of a more natural looking bar (e.g., the bar may have uncrushed and identifiable food elements, such as nuts, cereal, berries, etc.). For example, the food-element processing system 100 may produce one or more cereal or granola bars that may have large inclusions or large food elements included therein that remain identifiable (e.g., large nuts, small nuts, cookie pieces, granola, rice, such as puffed rice, dried fruit, chocolate chips, etc.) and/or uncrushed after the multiple-food-element batch 10 is compressed together, which may be facilitated by conforming one or more press surfaces of the food-element processing system 100 to the food elements in the multiple-food-element batch 10.

Generally, the sidewalls 140 and/or 145 of the food-processing cell 110 may have and/or may define any number of suitable shapes of the compression space 150. For example, compressing together the food elements of the multiple-food-element batch 10 may form an food item that may have any number of suitable shapes and/or sizes that may be at least in part defined by the sidewalls 140 and/or 145 (e.g., by the shape and/or size of the compression space 150 formed in part by the sidewalls 140, 145). Similarly, the first press surface 121 and/or second press surface 131 may define the shape and/or size of the food item(s) formed by compressing together the food elements of the multiple-food-element batch 10 in the food-processing cell 110.

To produce the aggregate food item(s), the distance between the first press surface 121 and second press surface 131 may be reduced in a manner that compresses together the multiple-food-element batch 10. For example, the first press body 120 may be advanced toward of the second press body 130. Alternatively or additionally, the second press body 130 may be advanced toward the first press body 120. In any event, reducing the space or distance between the first press surface 121 and second press surface 131 may compress together the food elements of the multiple-food-element batch 10.

Generally, the multiple-food-element batch 10 may include any number of suitable food elements that may have any number of suitable shapes and/or sizes. Furthermore, the shapes and/or sizes of the food elements of the multiple-food-element batch 10 may vary one from another. For example, the variously sized and shaped food elements of the multiple-food-element batch 10 may define or form upper and lower sides of the multiple-food-element batch 10 that may be generally non-planar and/or may have irregular shapes.

As described above, at least one of the press surfaces of the food-element processing system 100 may be conformable to at least one side or at least a portion of one side of the multiple-food-element batch 10. For example, the first press surface 121 may be at least partially conformable to upper side 11 of the multiple-food-element batch 10. Hence, for example, the first press surface 121 may be suitably pliable, such that pressing the first press surface 121 against the upper side 11 may at least partially conform the first press surface 121 to the shapes of the food elements defining the upper side 11.

For example, the first press body 120 may be configured as a container, and the first press surface 121 may form or define the outer surface of the container. The first press surface 121 and one or more walls operably connected to the first press surface 121 may collectively define or form interior space 122 of the first press body 120. For example, the interior space 122 may be suitably reconfigurable to facilitate or allow the first press surface 121 to reconfigure in a manner that the first press surface 121 forms complementary shapes with at least some of the food elements of the multiple-food-element batch 10 (e.g., at least some of the food elements that define the upper side 11 of the multiple-food-element batch 10).

In at least one example, the first press body 120 includes suitable medium or media (e.g., particulate medium) positioned in the interior space 122, which may be reconfigurable in a manner that allows the first press surface 121 to conform to the shapes of the food elements. Generally, suitable media may vary from one example to the next and/or may depend on the size(s) of the food elements, material of the first press surface 121, etc. For example, the first press body 120 may contain fine sand or other silica-type particulate media, talc or similar powder, metal powder, mill powder (e.g., corn mill, flour, pellets, coffee beans or grinds, rice grains, spherical elements, such as rubber spheres and plastic spheres, pebbles, etc.), among other suitable types of media. The media also may have any number of suitable sizes that may vary from one example to another (e.g., based on the size of food, such that the media sizes are smaller than at least some of the food elements in the multiple-food-element batch 10). For example, the media may include elements or particles that have cross-sectional sizes in one or more of the following ranges: from 100 µm to 200 µm; from 150 µm to 500 µm; from 400 µm to 1.5 mm; or from 1 mm to 3 mm. It should be appreciated, however, that the media may include particles with cross-sectional sizes outside of the above-described ranges.

Generally, the first press body 120 may include any number of suitable materials. For example, the first press surface 121 of the first press body 120 may include rubber, silicone, neoprene, nitrile, latex, vitrile, vinyl, or other suitably pliable or deformable materials and/or non-porous materials. Moreover, the thickness of the first press surface 121 may be suitable for conforming the first press surface 121 to the food elements of the multiple-food-element batch 10 (e.g., such that the first press surface 121 may bend, deform, and/or fold in a manner that at least conforms to and/or at least partially surrounds the food elements in contact therewith. As described below in more detail, the first press surface 121 may include compressible material or compression-deformable material that may be softer than the food elements of the multiple-food-element batch 10 (e.g., the material of the first press surface 121 may be compressed by a selected amount or percentage responsive to the forces between the first press surface 121 and the food elements of the multiple-food-element batch 10 without extensively damaging or substantially without damaging the food elements).

When the first press body 120 is in a deformable or pliable state, the particles of the medium located in the interior space 122 of the first press body 120 may be generally movable relative to one another. For example, pressing the first press surface 121 against the upper side 11 of the multiple-food-element batch 10 (e.g., with a suitable pressure or first pressure) may deform the interior space 122 (e.g., by moving the particles inside the interior space 122 relative to one another), such that the first press surface 121 at least partially conforms to the food elements of the multiple-food-element batch 10 and/or forms one or more shapes that are complementary to the shapes of the food elements of the multiple-food-element batch 10.

For example, the food-element processing system 100 may include and/or may be operably coupled to a controller 200 that may direct or control operation of one or more elements or components of the food-element processing system 100. Moreover, it should be appreciated that the space between the first press body 120 and second press body 130 may be reduced by advancing the first press body 120 toward the second press body 130 and/or by advancing the second press body 130 toward the first press body 120 with any number of suitable mechanisms. For example, a hydraulic or pneumatic cylinder may be operably coupled to the first press body 120 in a manner the moves the first press body 120 toward and/or away from the second press body 130 (e.g., to compress together the food elements of the multiple-food-element batch 10 and/or to release the food item formed therefrom).

Furthermore, the controller 200 may control or direct operation of the mechanism(s) that may advance the first press body 120 toward the second press body 130. For example, the food-element processing system 100 may include a regulator valve (e.g., a solenoid valve) that may be operated to direct the flow of fluid to a cylinder that moves the first press body 120. In an example, the controller 200 may operate the valve in a manner that allows the fluid to flow to the cylinder, thereby advancing the first press body 120 toward the second press body 130 (to compress together the food elements of the multiple-food-element batch 10), and away from the cylinder, thereby increasing the space between the second press body 130 and the first press body 120 (e.g., by moving the first press body 120 away from the second press body 130), to release and/or dispense the food item from the food-processing cell 110. Moreover, it should be appreciated that other suitable mechanisms, such as cams, screw mechanisms, etc., may be operated by one or more electrical motors; in some examples, the electrical motor(s) may be operably coupled to the controller 200 that may operate or direct operation thereof.

Figure 1B:
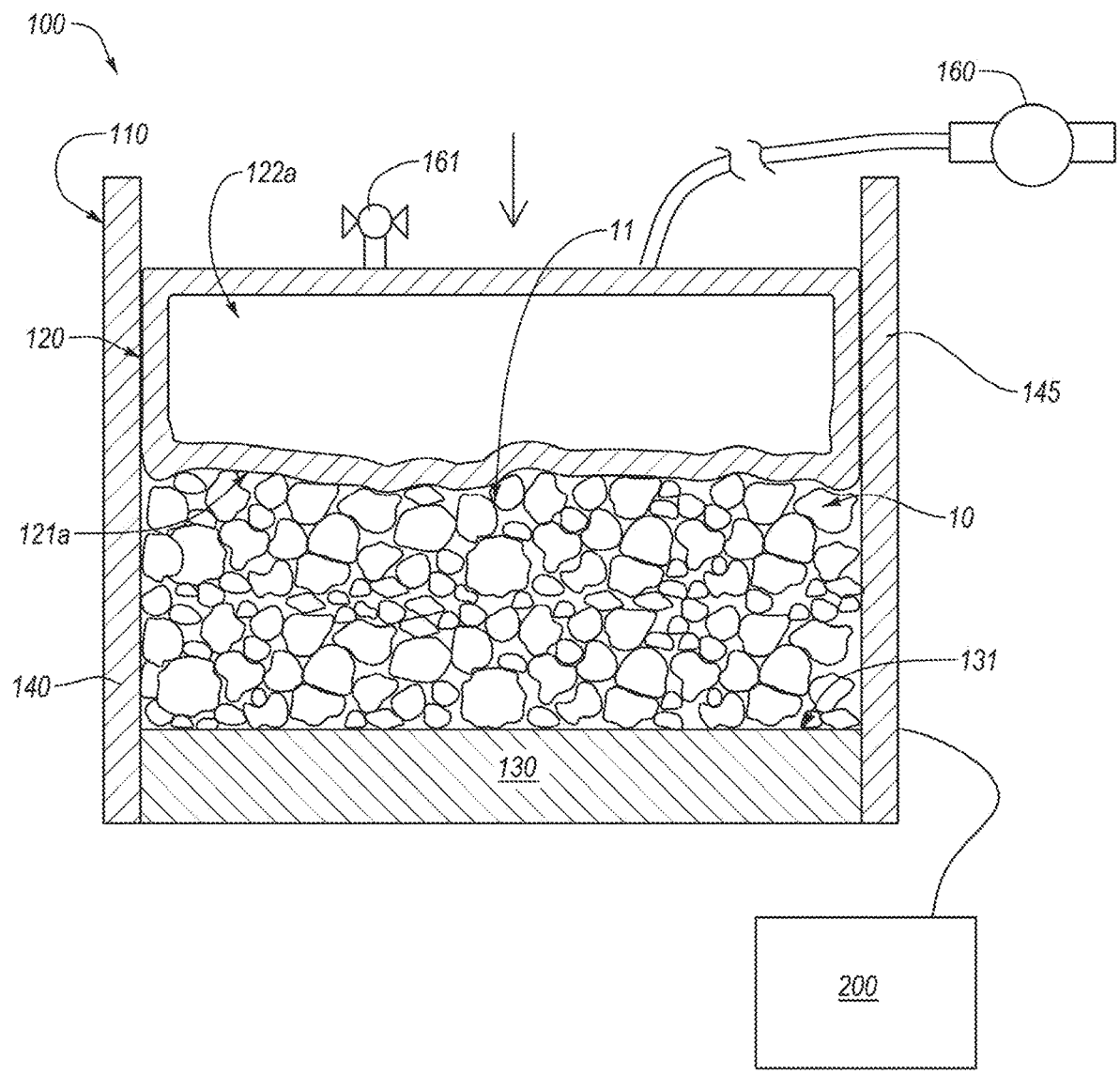
FIG. 1B is a schematic, cross-sectional side view of the food-processing cell of FIG. 1A with press surfaces at a second distance therebetween and an upper surface reconfigured to at least partially conform to one or more food elements located in the food-processing cell.

FIG. 1B is a schematic, cross-sectional view of the food-element processing system 100, with the first press body 120 in a deformed state that may be produced by engaging the first press body 120 with the multiple-food-element batch 10, according to an example. For example, the space between the first press surface 121 and the second press body 130 (FIG. 1B) may be suitably reduced such as to contact and/or press the first press surface 121 against the upper side 11 of the multiple-food-element batch 10, as shown in FIG. 1B. Under some operating conditions, suitable force may be applied to the first press surface 121 (FIG. 1A) and to the upper side 11 of the multiple-food-element batch 10, such as to deform and the first press surface 121 (FIG. 1A) in a manner that forms a conformed first press surface 121a, as shown in FIG. 1B. For example, the interior space 122 (FIG. 1A) may be deformed in a manner that facilitates formation of the conformed first press surface 121a. In some examples, the first press surface 121 (FIG. 1A) may be generally planar, and the conformed first press surface 121a may have a nonplanar configuration (e.g., irregular, multi-curved, etc.) that generally follows or contours the shapes of the food elements at the upper side 11 of the multiple-food-element batch 10.

In an example, the deformed interior space 122a may have the same volume as the interior space 122 (FIG. 1A). For example, the particles inside the interior space 122 (FIG. 1A) may move such that the interior space 122 (FIG. 1A) maintains the same overall volume as the volume of the deformed interior space 122a but changes the shape of the volume. Alternatively, however, the volume of the deformed interior space 122a may be different than the volume of the interior space 122 (FIG. 1A). For example, as the particles inside the interior space 122 (FIG. 1A) are compressed in response to forces exerted on to the first press surface 121 (FIG. 1A), the particles may be rearranged and/or pushed closer to one another, thereby reducing the amount of air or other fluid (e.g., liquid, semi-liquid, gel, or combinations of different fluids) located between the particles, to form the conformed first press surface 121a.

As described above, to reconfigure the first press surface 121 (FIG. 1A) into the conformed first press surface 121a, the first press surface 121 and/or the interior space 122 (FIG. 1A) may be generally deformable when pressed against the multiple-food-element batch 10. To compress together the food elements of the multiple-food-element batch 10, rigidity or stiffness of the conformed first press surface 121a and/or deformed interior space 122a may be suitably increased, such that to substantially prevent further deformation thereof. In an example, the particles inside the deformed interior space 122a may be jammed one against another, in a manner that stiffens the deformed interior space 122a and prevents or impedes further deformation thereof, thereby at least partially preventing or impeding further deformation of the deformed interior space 122a.

For example, the particles inside the deformed interior space 122a may be jammed by reducing the pressure in the deformed interior space 122a, such as below atmospheric pressure (e.g., by forming at least a partial vacuum in the deformed interior space 122a). In an example, the food-element processing system 100 may include a pump 160 (e.g., a vacuum pump) that may be operably coupled to and/or in fluid communication with the deformed interior space 122a. For example, the pump 160 may be operated to remove fluid that may be located in the deformed interior space 122a.

In some examples, the deformed interior space 122a may include air or other similar gaseous fluid that may be removed therefrom by the pump 160 (e.g., after the interior space 122 (FIG. 1A) is reconfigured into the deformed interior space 122a). Additionally or alternatively, the deformed interior space 122a may include any other suitable fluid therein (e.g., one or more liquids, semi-liquids and gels, such as water, polypropylene glycol, etc.). For example, the fluids may be removed from the deformed interior space 122a by the pump 160, to increase the rigidity of the deformed interior space 122a, thereby increasing the rigidity of the conformed first press surface 121a.

Figure 1C:
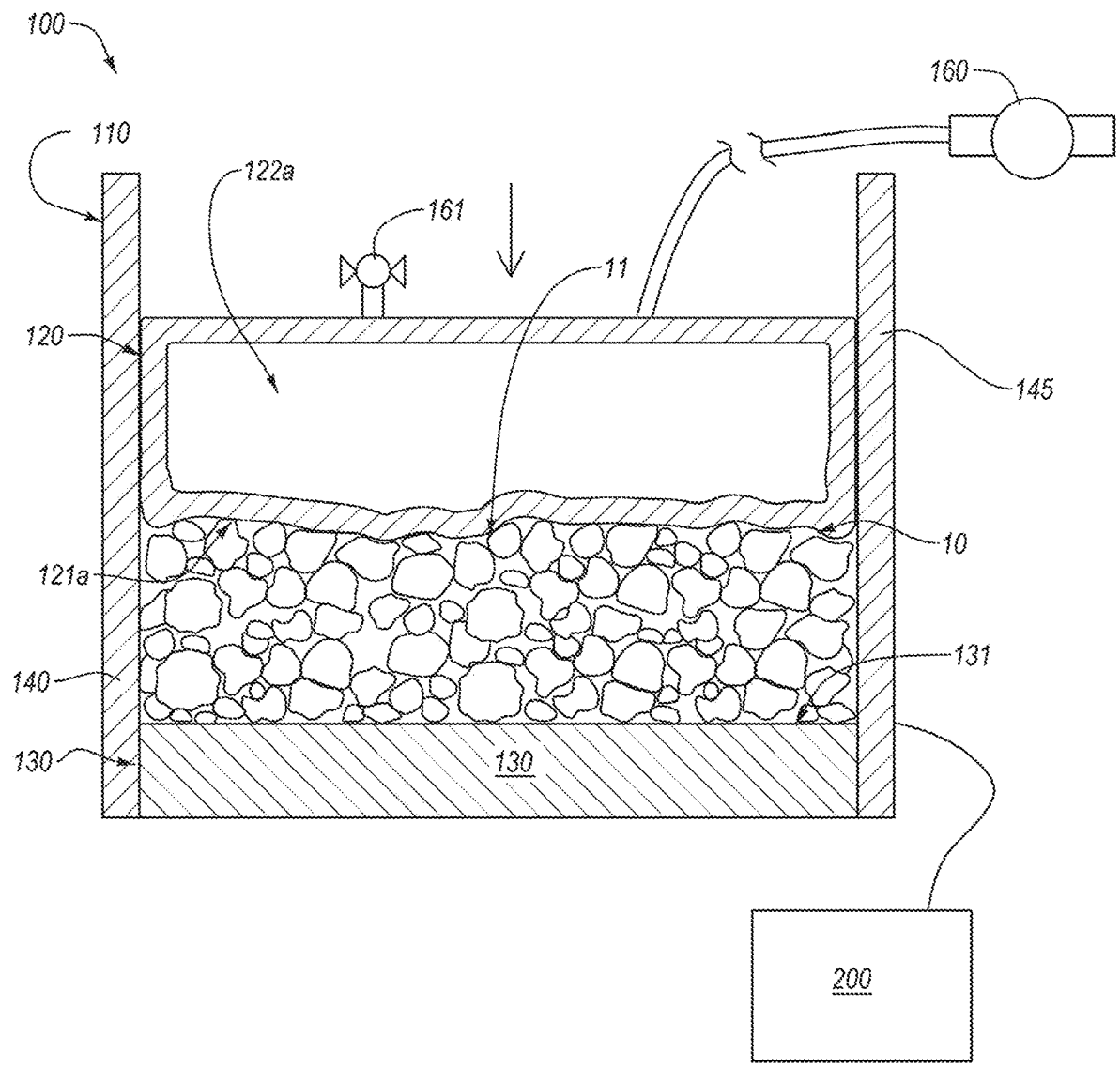
FIG. 1C is a schematic, cross-sectional side view of the food-processing cell of FIG. 1A with press surfaces at a third distance therebetween and the food elements being compressed in the food-processing cell.

FIG. 1C is a schematic, cross-sectional view of the food-element processing system 100 with the multiple-food-element batch 10 compressed and the food-processing cell 110 thereof, according to at least one example. In at least one example, after increasing the rigidity of the deformed interior space 122a and/or the conformed first press surface 121a (e.g., by removing one or more fluids from the deformed interior space 122a), the space between the conformed first press surface 121a and the second press surface 131 of the second press body 130 may be further decreased and/or the pressure applied onto the first press body 120 may be increased, to compress together the food elements of the multiple-food-element batch 10. As described herein, conforming the deformed interior space 122a to the shapes and/or sizes of the food elements of the multiple-food-element batch 10 (e.g., at the upper side 11 of the multiple-food-element batch 10) may better distribute pressure applied by the first press body 120 onto the food elements (e.g., as compared with a generally planar or under formed press surface).

In some examples, the second press surface 131 of the second press body 130 may be generally rigid or undeformable and may have any number of suitable shapes (e.g., the second press surface 131 may be substantially planar). For example, the food elements on a bottom side of the multiple-food-element batch 10, which contact the second press surface 131, may be at least partially crushed and/or compressed in a manner that forms the food item with a bottom surface that is formed by food elements that have been deformed to lay along a surface that is generally planar or otherwise complementary to the surface of the second press surface 131.

As described below in more detail, the food-processing cell 110 may be operated to compress the multiple-food-element batch 10 (FIG. 1A) to form the food item 20, to release or dispense the food item 20, to receive additional food elements defining the multiple-food-element batch 10, and repeat the cycle, as described above. Hence, for example, after dispensing food item 20 and receiving new or additional food elements, the conformed first press surface 121a may be reconfigured to have a generally uniform or continuous surface (e.g., as first press surface 121 (FIG. 1A)) and may be subsequently reconfigured to have complementary shapes after contacting the food elements, as described above. For example, the first press body 120 may include a valve 161 that may be operated in a manner that increases the pressure inside the first press body 120 (e.g., to at least the atmospheric pressure).

For example, the valve 161 may by operated manually or automatically to allow outside or atmospheric air to enter the deformed interior space 122a of the first press body 120, to reconfigure the deformed interior space 122a to generally interior space 122 (FIG. 1A). In some examples, other suitable fluids may be allowed to enter the deformed interior space 122a in a manner that reconfigures the deformed interior space 122a to be generally deformable, as described above. Additionally or alternatively, the pump 160 may be configured to reverse fluid flow, such that the pump 160 operates as a compressor or a pump to flow and/or force fluid into the deformed interior space 122a (e.g., to produce a suitable pressure therein), such that the deformed interior space 122a is reconfigured into the interior space 122 (FIG. 1A), which is deformable and/or reconfigurable in a manner that allows the press surface to reconfigure and/or conform to the food elements.

Figure 2:
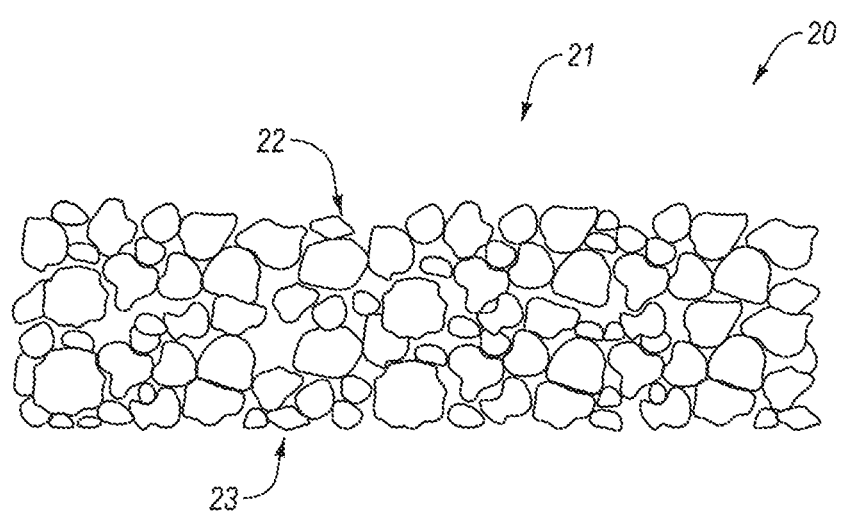
FIG. 2 is a schematic side view of a food item produced by the food-processing cell of FIG. 1A, according to an embodiment.

FIG. 2 is a schematic cross-sectional view of an example food item 20 produced by compressing the multiple-food-element batch 10 in the food-processing cell 110 (FIGS. 1A-1C), as described above. Specifically, for example, the food item 20 may include an upper side 21 defined by one or more food elements 22, and a bottom side 23. In the illustrated example, the upper side 21 has a generally nonplanar surface that is formed by the outer surfaces of the generally undeformed food elements 22. By contrast, the surface of the bottom side 23 generally lies along a plane that corresponds to the shape of the second press surface 131 of the second press body 130 (FIGS. 1A-1C).

As mentioned above, the food item 20 may be formed from any number of suitable food elements. For example, one or more generally incompressible elements and/or shapeless elements (e.g., consumers may not associate the food element with any particular shape) may form or define one or more portions of the food item 20. For example, the bottom side 23 may be formed from a layer or a block, such as a layer of chocolate, peanut butter, etc. Moreover, in some examples, the food-processing cell may include at least two conformable surfaces that may be deformed (e.g., reversibly deformed) or otherwise reshaped to conform to the food elements of a multiple-food-element batch positioned in the compression space at least partially defined thereby.

Figure 3A:
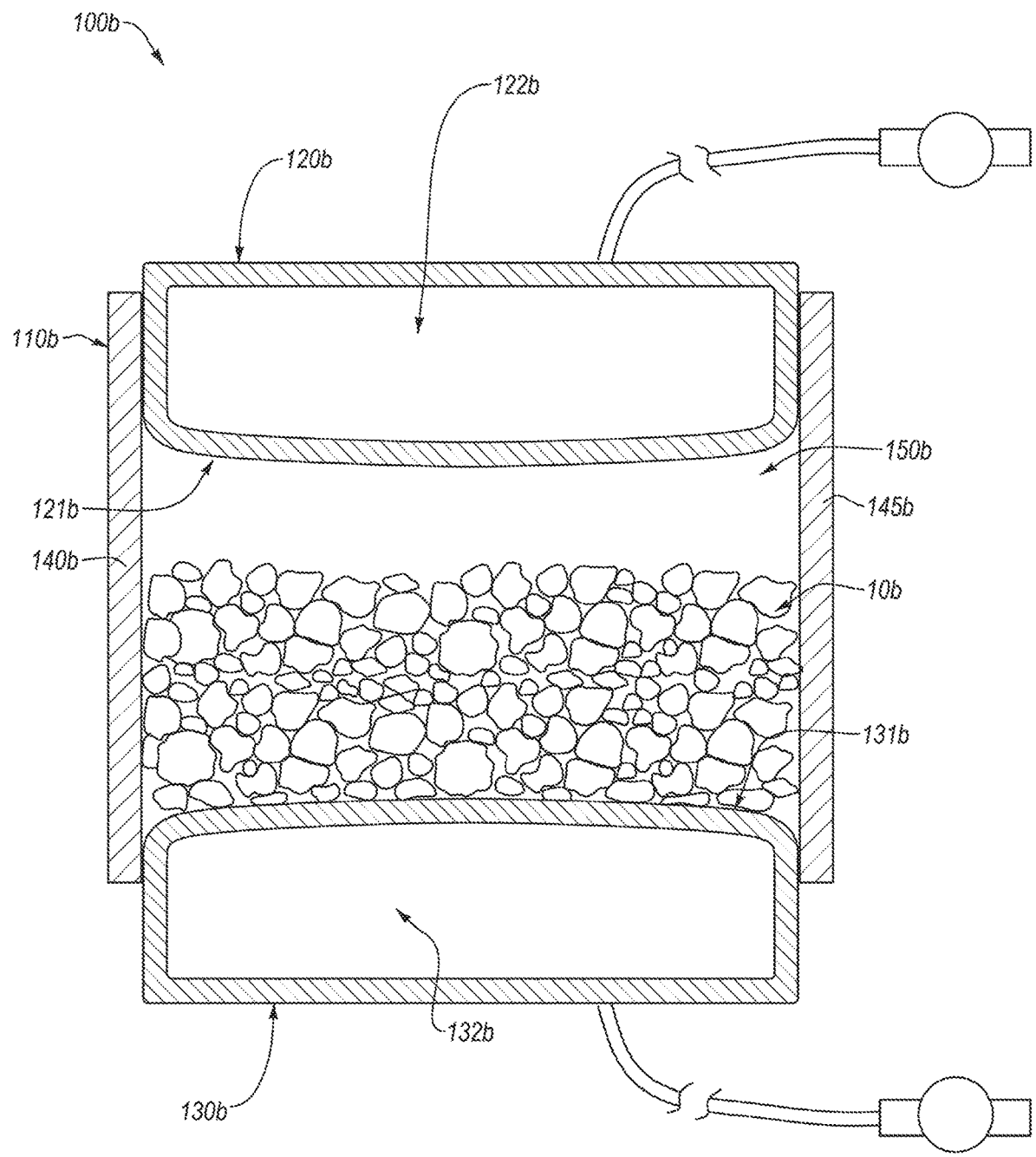
FIG. 3A is a schematic, cross-sectional view of a food-processing cell with press surfaces at a first distance therebetween, according to an embodiment.
Figure 3B:
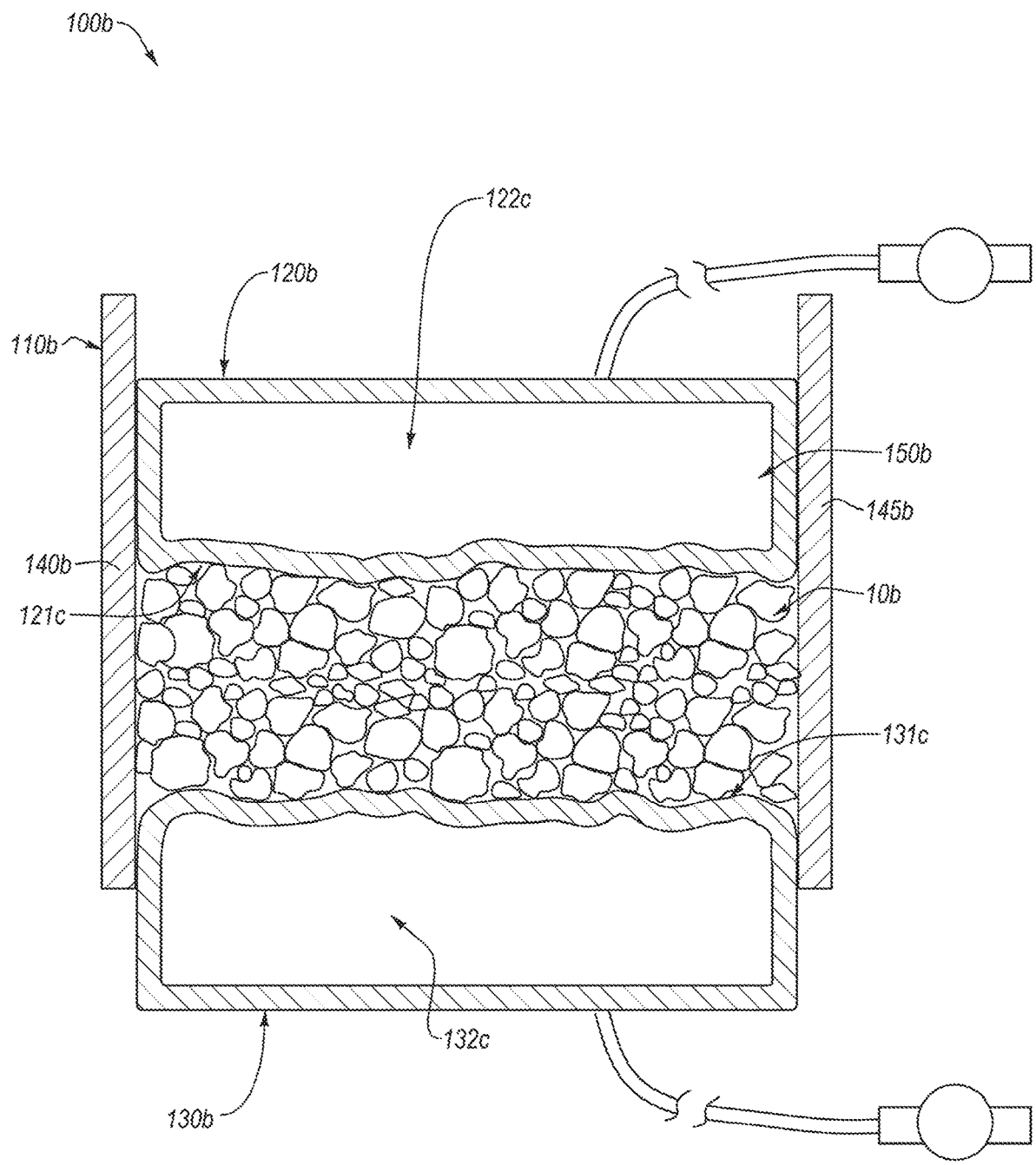
FIG. 3B is a schematic, cross-sectional side view of the food-processing cell of FIG. 3A with press surfaces at a second distance therebetween and a first press surface and a second press surface reconfigured to at least partially conform to one or more food elements located in the food-processing cell.
Figure 3C:
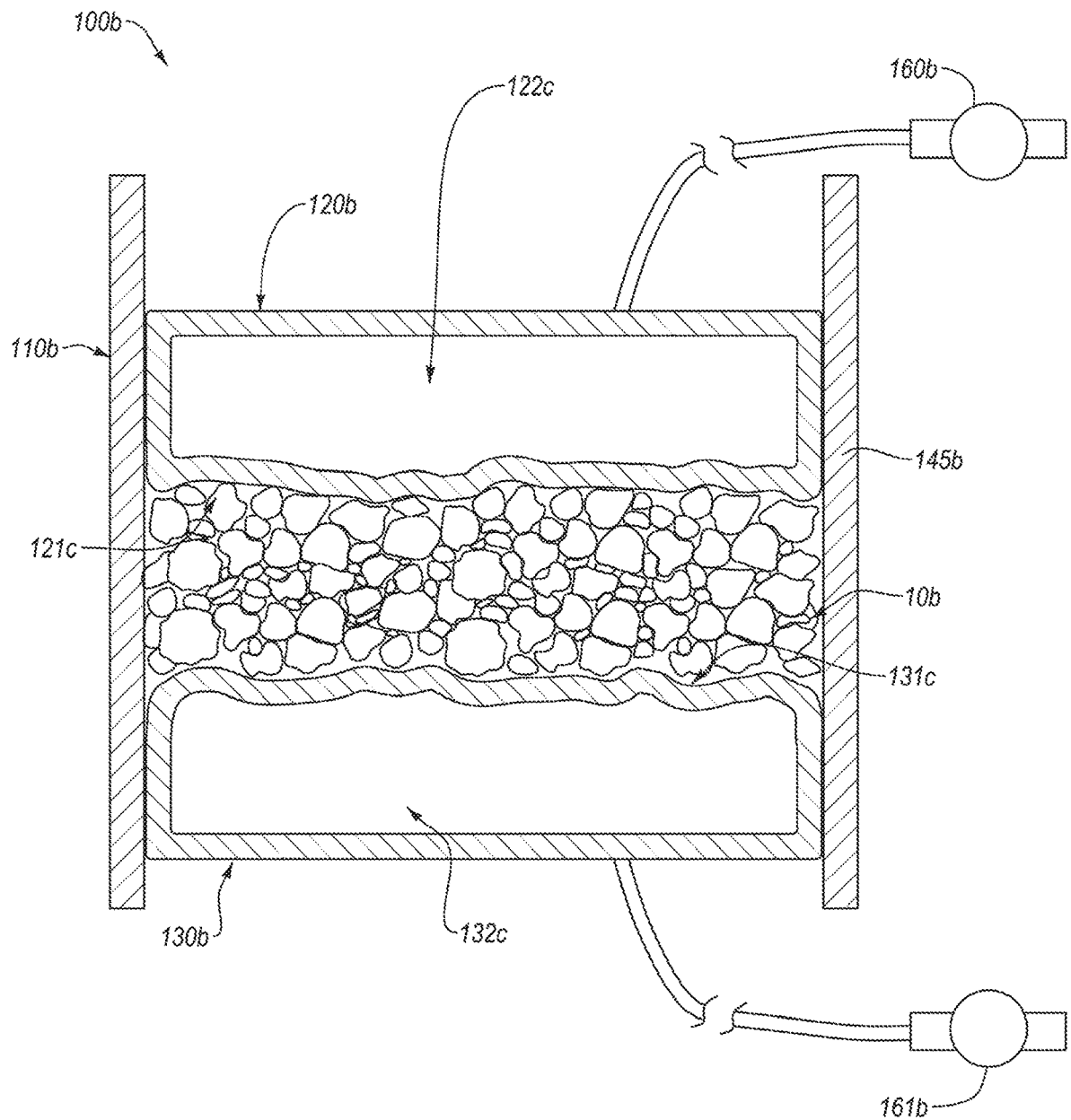
FIG. 3C is a schematic, cross-sectional side view of the food-processing cell of FIG. 3A with press surfaces at a third distance therebetween and the food elements being compressed in the food-processing cell.

In some embodiments, the food-element processing system may include two or more conformable press surfaces, such as to reduce or eliminate damaging or breaking the food elements at the outer surface of the multiple-food-element batch compressed by the food-element processing system. FIGS. 3A-3C are schematic, cross-sectional views of a food-element processing system 100b that includes at least one food-processing cell 110b, according to one or more examples. Specifically, FIG. 3A illustrates the food-element processing system 100b that has a multiple-food-element batch 10b positioned in the food-processing cell 110b (before modification of the press surfaces). FIG. 3B illustrates the food-element processing system 100b with two of the press surfaces reconfigured to at least partially conform to the respective outer sides of the multiple-food-element batch 10b, and FIG. 3C illustrates the food-element processing system 100b compressing together food elements of the multiple-food-element batch 10b (to produce a food item from the multiple-food-element batch 10b, as described below in more detail).

Generally, except as described herein, the food-element processing system 100b and its elements and components may be similar to or the same as the food-element processing system 100 (FIGS. 1A-1C) and its respective elements and components. For example, as shown in FIG. 3A, the food-element processing system 100b may include a first press body 120b, second press body 130b, and sidewalls 140b, 145b, which collectively define a compression space 150b. In the illustrated example, the first press body 120 includes a first press surface 121b. Furthermore, the first press surface 121b together with one or more walls of the first press body 120b may define an interior space 122b. In some examples, the interior space 122b and/or the first press surface 121b may be suitably deformable or conformable, to conform to the food elements that define the upper side 11 of the multiple-food-element batch 10b. For example, the interior space 122b may include suitable filler that may support the first press surface 121b of the first press body 120b (e.g., in the manner described above).

Additionally or alternatively, the second press body 130b may include a conformable press surface second press surface 131b that may at least partially conform to one or more shapes and/or sizes of the food ingredients that define a bottom side of the multiple-food-element batch 10b. The second press body 130b may have a similar configuration to the first press body 120 (FIGS. 1A-1C). For example, the second press surface 131b together with one or more walls and/or a base portion of the second press body 130b may define or form an interior space 132b (e.g., which may be similar to or the same as the interior space 122 (FIGS. 1A-1C)). In some examples, the second press body 130b may include suitable medium, such as a particulate medium (e.g., sand, talc powder, metallic powder, etc.) located in the interior space 132b.

Moreover, the second press body 130b may include suitable fluid located in the interior space 132b in a manner that may facilitate movement or relative shifting among the particles of the medium located in the interior space 132b. As mentioned above, in some examples, removing at least a portion of the fluid located inside the interior space 132b may reduce the shiftability and/or may cause jamming of adjacent particles, such as to reduce or prevent the interior space 132b and/or the second press surface 131b from deformation responsive to pressure from contact with the food elements of the multiple-food-element batch 10b.

As mentioned above, the conformable press surfaces of the food-processing cell may be pressed against the food elements in a manner that deforms the conformable press surfaces about the food elements. For example, the first press surface 121b and second press surface 131b (and the corresponding interior space 122b and interior space 132b) may be reconfigured to at least partially conform to the respective upper and bottom sides of the multiple-food-element batch 10b, to form the respective conformed first press surface 121c and conformed second press surface 131c (and interior spaces 122c and 132c), as shown in FIG. 3B. In some examples, the first press body 120b may be advanced toward the second press body 130b. Additionally or alternatively, the second press body 130b may be advanced toward the first press body 120b. In each instance, distance between the first press body 120b and second press body 130b may be reduced in a manner that presses the first press surface 121b and second press surface 131b (FIG. 3A) to form the conformed first press surface 121c and conformed second press surface 131c.

In some examples, the food-processing cell 110b includes sidewalls 140b, 145b. Hence, as the distance between the first press body 120b and second press body 130 is reduced, the food elements of the multiple-food-element batch 10b are constrained by the sidewalls 140b, 145b (e.g., from being pushed outward), such that the advancement of the first press body 120b and/or second press body 130b forms the conformed first press surface 121c and conformed second press surface 131c (e.g., as shown FIG. 3B). It should also be appreciated that the sidewalls 140b and/or 145b may have similar configurations as the first press body 120b and/or second press body 130b (e.g., the sidewalls 140b and/or 145b may be conformable to the food elements of the multiple-food-element batch 10b). Moreover, the space or volume defined by the first press body 120b, second press body 130b and by the sidewalls 140b and 145b may have any number of suitable shapes and/or sizes, which may vary from one embodiment to another (e.g., such as to form any number of suitable shapes of the food item, which may have any number of sides formed or defined by undeformed food elements).

In an example, the conformed first press surface 121c and/or conformed second press surface 131c may be stiffened after suitable deformation thereof (e.g., to conform to the shapes of the food elements of the multiple-food-element batch 10b). For example, a pump 160b may be operably coupled to the first press body 120b and may reduce pressure in the interior space 122c (e.g., to produce jamming among the particles that are located inside the first press body 120b, thereby stiffening the interior space 122c and conformed first press surface 121c). Similarly, the first press body 120b may be operably coupled to a vacuum pump 161b that may reduce pressure in the interior space 132c (e.g., to produce jamming among the particles that are located inside the second press body 130b, thereby stiffening the interior space 132c and conformed first press surface 121c). It should be appreciated that, in some examples, a single vacuum pump may be operably coupled to the first press body 120b and second press body 130b and may reduce pressure in the respective interior spaces 122c and 132c thereof (e.g., generally simultaneously, regulated by a valve, etc.).

Figure 4:
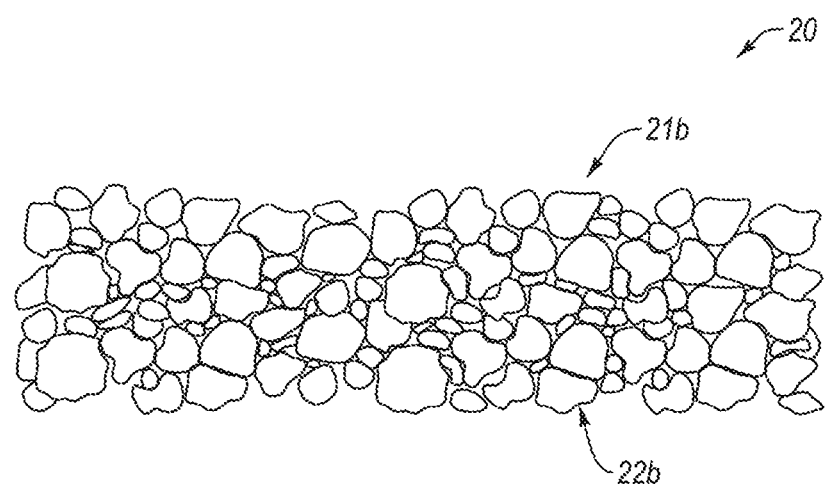
FIG. 4 is a schematic side view of a food item produced by the food-processing cell of FIG. 3A, according to an embodiment.

Moreover, as shown in FIG. 3C, after the conformed first press surface 121c and/or conformed second press surface 131c are suitably stiffened, the first press body 120b and second press body 130b may further compress together the food elements to produce food item 20b (FIG. 4). After the food item 20b is produced (e.g., after the food elements are suitably compressed together to bond one to another in a manner that forms a single unit or food item 20b (FIG. 4)), the food item 20b (FIG. 4) may be released or dispensed from the food-processing cell 110b. For example, the food item 20b (FIG. 4) may be released onto a conveyor belt or may be otherwise dispensed for further processing (e.g., packaging, etc.). As described above, compressing the multiple-food-element batch 10b and producing the food item 20b (FIG. 4) may be performed repeatedly or cyclically, so that the food-processing cell 110b is operated to receive new multiple-food-element batch 10b after producing the food item 20b (FIG. 4).

Again, the food item 20b (FIG. 4) may have any number of suitable shapes and/or sizes. FIG. 4 is a side view of the food item 20b according to at least one example. As shown in FIG. 4, the food item 20b may have substantially undamaged or un-crushed food elements that define the respective upper and bottom sides thereof 21b, 22b (e.g., the sides that were compressed by conformable press surfaces).

Figure 5:
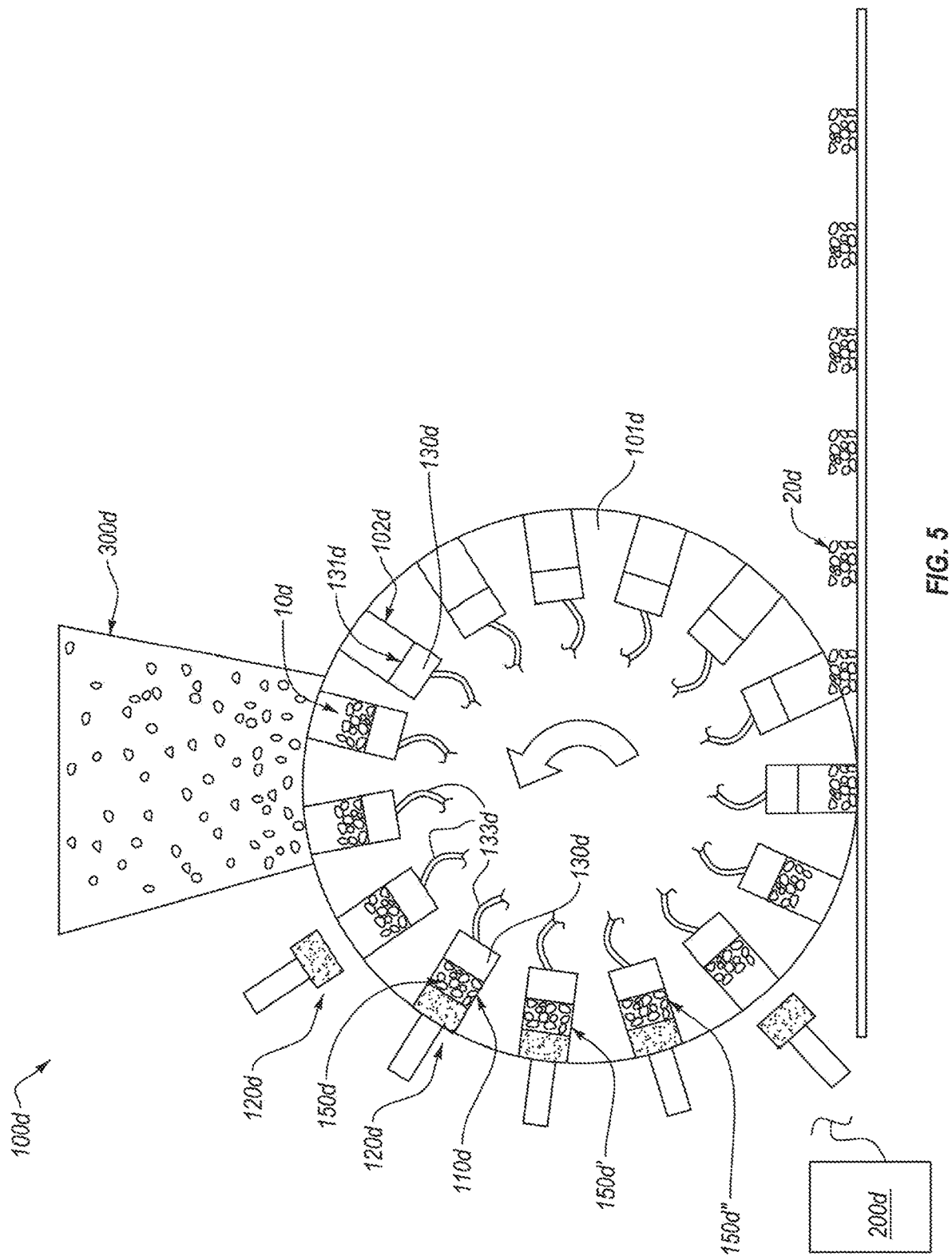
FIG. 5 is a schematic, cross-sectional view of a food processing system that includes multiple cells, illustrating that in some examples a continuous surface may be used to provide a press surface for multiple cells, according to an embodiment.

Generally, food-processing systems may include any number of food-processing cells (e.g., such as to increase the production output or throughput of the food-processing system). FIG. 5 is a schematic side view of a food-element processing system 100d that includes multiple food-processing cells, according to one or more examples. Generally, any of the food-element processing systems described herein may be similar to or the same as any of the food-processing systems described below.

In the example illustrated in FIG. 5, the food-element processing system 100d includes multiple cavities 102d that may receive food elements and may be selectively and/or cyclically positioned in alignment with one or more pistons and/or press surfaces, such that the press surface(s) may compress together the food elements inside the cavities 102d. For example, the cavities 102d may be defined by one or more side walls and by second press surfaces 131d (e.g., one, some, or each of the cavities 102d may have respective second press bodies 130d positioned at the bottom thereof, such the respective ones of the second press surfaces 131d define the corresponding shapes and sizes of the cavities 102d.

Generally, the food-processing cell 110d may be included on and/or defined by a suitable carrier, such as carrier 101d. In the illustrated embodiment, the carrier 101d is cylindrical and may rotate about a rotation axis (as indicated with the arrow). Alternatively, the carrier 101d may have any number of suitable shapes and/or sizes, such as rectangular, spherical, etc., and may be suitably advanced (e.g., linearly, rotationally, or combinations thereof) in a manner that suitably aligns or positions the cavities 102d with corresponding pistons (e.g., as described below).

As shown in FIG. 5, the food-element processing system 100d may include a food-element dispenser 300d. In the illustrated example, the dispenser 300 is configured as a chute—the food elements may be positioned in the interior of the dispenser 300d and may slide down (under gravity)

toward and into the cavities 102d, as the carrier 101d rotates and aligns the cavities 102d with the dispenser 300d. For example, the food elements located in the cavities 102d may collectively form or define a multiple-food-element batch 10d that may be compressed to produce food item 20d. It should be appreciated that any number of suitable food-element dispensers, which may have any number of suitable configurations, may be positioned and configured to dispense food elements into the cavities 102d of the food-element processing system 100d (e.g., suitable food-element dispensers may include a vacuum-powered dispenser, a gravity-fed dispenser with a selectively openable shutter, etc.).

As described above, the multiple-food-element batch 10d may include one or more food binders, such as honey, sugar water, etc. Specifically, the food binder(s) may be configured to bind together the food elements of the multiple-food-element batch 10d. In some examples, the food elements may be pre-coated with one or more binders (e.g., the food elements may include a binder coating before entering the cavities 102d and/or before entering the dispenser 300d). Additionally or alternatively, one or more food binders may be added to the food elements after placement thereof in the cavities 102d. For example, food binders may be injected or dispensed on the multiple-food-element batch 10d from a food-binder dispenser that may be positioned downstream in the processing workflow.

In some embodiments, after receiving the food elements in the cavities 102d, the food-element processing system 100d may be configured to position the cavities 102d in alignment with first press bodies 120d, such that the first press body 120d may enter the cavities 102d and compress together the food elements of the multiple-food-element batch 10d located therein. Generally, the food-element processing system 100d may include any number of first press body 120d that may be positioned and/or arranged in any number of suitable ways, to enter the respective cavities 102d. Furthermore, as the first press bodies 120d enters the cavities 102d, the walls of the cavities 102d together with the second press bodies 130d and the first press bodies 120d may define the food-processing cell 110d, within which the multiple-food-element batch 10d may be compressed to produce the food item 20d.

Generally, the first press bodies 120d and/or second press bodies 130d and the respective elements and components thereof may be similar to or the same as any of the press bodies described herein. For example, the first press bodies 120d and/or second press bodies 130d may have conformable press surfaces that may be at least partially conformed to the shapes of the food elements located in the corresponding food-processing cells 110d. Specifically, for example, the first press bodies 120d may be advanced toward the second press bodies 130d to contact (and lightly compress) the food elements in the multiple-food-element batch 10d. As described above, pressing the conformable press surfaces of the first press bodies 120d and/or second press bodies 130d against the food elements of the multiple-food-element batch 10d may suitably deform that press surfaces to at least partially conform to the food elements and/or to form complementary shapes therewith. In some embodiments, food-processing cell 110d may be a compression cell. For example, food-processing cell 110d may be a plurality of compression cells.

Hence, for example, as shown in FIG. 5, as the first press bodies 120d enter the corresponding cavities 102d, the respective food-processing cell 110d may have a compression space 150d defined by the respective first press body 120d, second press body 130d, and one or more walls of the cavity 102d. The compression space 150d may have a first shape, such that the press surfaces of the first press body 120d and the second press body 130d (which defined the compression space 150d) are positioned at a first distance from each other. Subsequently, the compression space 150d may be reconfigured by pressing the first press body 120d and/or second press body 130d against the multiple-food-element batch 10d, to form a compression space 150d'. Specifically, the compression space 150d' may be defined by the deformed or conformed press surfaces of the first press body 120d and second press body 130d. Subsequently, the press surfaces of the first press body 120d and/or second press body 130d may be stiffened by reducing pressure in the respective interior spaces thereof (respectively defined by the press surfaces and one or more walls of the respective first press body 120d and second press body 130d).

For example, the first press body 120d and/or second press body 130d may be connected to a pump (e.g., a vacuum pump) that may selectively reduce the pressure therein (e.g., when the food-processing cell 110d defines the compression space 150d'). In some examples, the second press bodies 130d may include fluid-flow lines 133d that may be in fluid communication with the interior space of the second press bodies 130d and operably coupled to the pump, such that the pump may at least partially remove one or more fluids from the interior space of the second press bodies 130d, thereby stiffening the conformed press surface of the second press bodies 130d (to maintain the shape thereof during further compression of the multiple-food-element batch 10d). Similarly, the first press bodies 120d may be operably coupled to one or more pumps (e.g., to the same pump(s) as the second press bodies 130d), which may selectively reduce and/or increase pressure in the interior of the first press bodies 120d to stiffen the press surfaces thereof and to increase pliability of the press surfaces, as described herein.

As mentioned above, the food-element processing system 100d may include a controller 200d that may control operation of one or more elements and/or components thereof. For example, the controller 200d may detect suitable positioning of the first press bodies 120d within the cavities 102d to direct activation of the pump and/or one or more valve to flow fluid from the interior spaces of the first press bodies 120d and/or second press bodies 130d and thereby stiffen the respective press surfaces thereof). For example, the controller 200 may receive one or more signals received from one or more position sensors (e.g., one or more encoders operably coupled to the actuator that is configured to move the first press bodies 120d, such as linear encoders, rotary encoders, hall sensors, etc.), one or more pressure sensors, etc. Hence, for example, the controller 200d may determine a suitable position of the first press bodies 120d, suitable pressure experienced by the press surfaces of the first press bodies 120d and/or second press bodies 130d, etc., at which to stiffen the press surfaces of the first press bodies 120d and/or second press bodies 130d.

After the press surfaces of the first press bodies 120d and/or second press bodies 130d are suitably stiffened (e.g., as described above), to maintain the respective conformed shapes thereof, the compression space 150d' may be reconfigured to compression space 150d'', which the first press bodies 120d and second press bodies 130d are positioned closer together. For example, the first press bodies 120d and second press bodies 130d may compress together the food elements of the multiple-food-element batch 10d to produce the food items 20d. Moreover, after the food elements of the multiple-food-element batch 10*d* are suitably compressed together, the first press bodies 120*d* may be removed from the cavities 102*d* to allow the food items 20*d* to be dispensed from the cavities 102*d*.

In the illustrated example of FIG. 5, the carrier 101*d* may rotate, such that the cavities 102*d* that contain the food items 20*d* are oriented downward, and the food items 20*d* may fall therefrom under gravity. It should be appreciated, however, the food items 20*d* may be removed from the cavities 102*d* (e.g., with a robotic arm, suction, air pressure, modification of press bodies, etc., and may be positioned at any number of suitable locations). Furthermore, in the illustrated embodiment, the food-element processing system 100*d* includes a conveyor belt. For example, the food items 20*d* may be dispensed from the cavities 102*d* onto the conveyor belt. In some examples, the conveyor belt may relocate the food items 20*d* to a suitable location for further processing (e.g., packaging).

Figure 6:
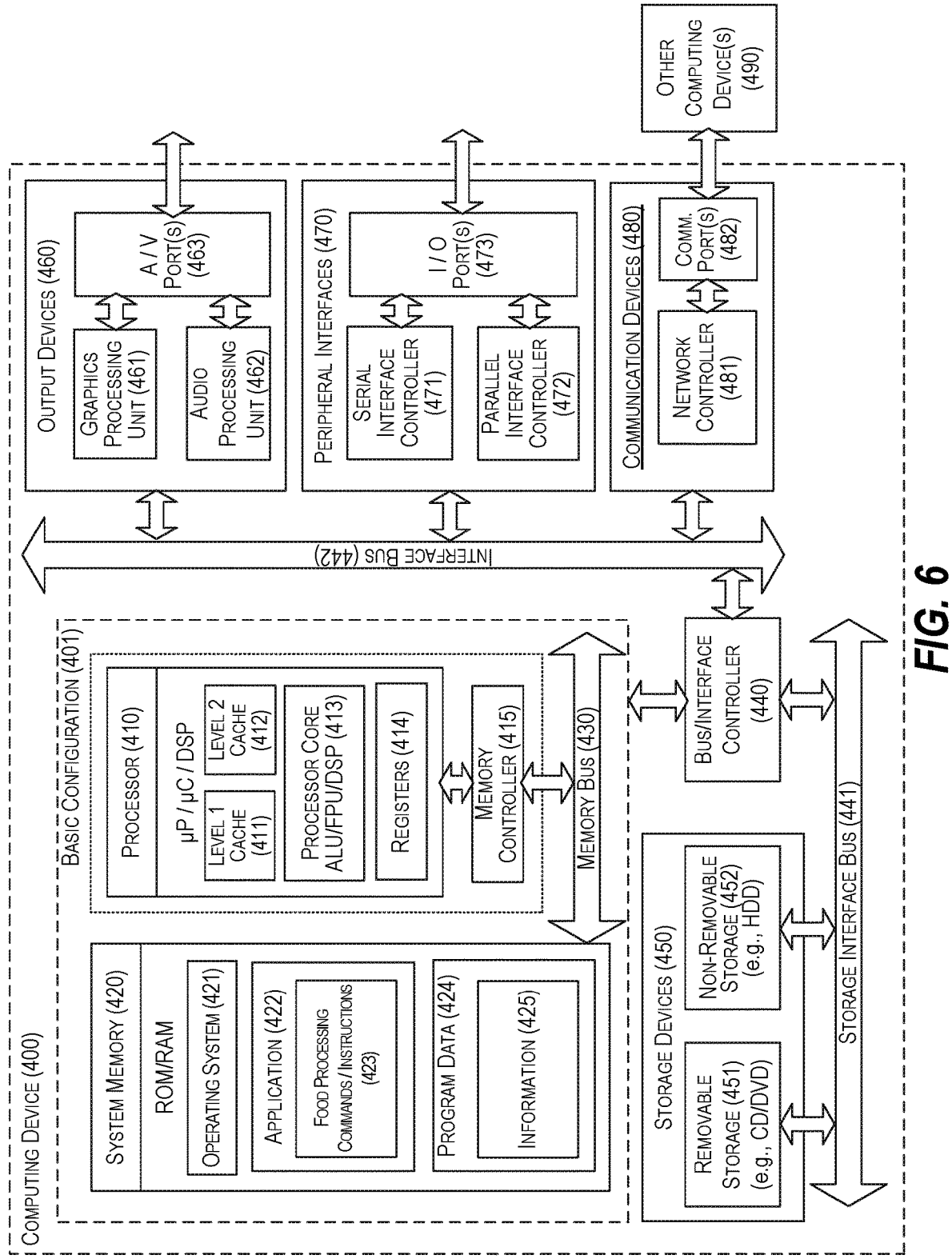
FIG. 6 is a block diagram illustrating an example computing device that is arranged for at least partially controlling any of the systems or performing any of the methods disclosed herein, according to an embodiment.

Generally, the controller (e.g., the controller 200 or 200*d*) may be or may include any number suitable computing devices. FIG. 6 is a block diagram illustrating an example computing device 400 that is arranged for at least partially controlling any of the systems or performing any of the methods disclosed herein, arranged in accordance with at least some of the examples of the present disclosure. In one configuration 401, computing device 400 includes one or more processors 410 and system memory 420. A memory bus 430 may be used for communicating between the processor 410 and the system memory 420.

Depending on the desired configuration, processor 410 may be of any type including but not limited to a microprocessor (μP), a microcontroller (μC), a digital signal processor (DSP), or any combination thereof. Processor 410 may include one or more levels of caching, such as a level one cache 411 and a level two cache 412, a processor core 413, and registers 414. An example processor core 413 may include an arithmetic logic unit (ALU), a floating point unit (FPU), a digital signal processing core (DSP Core), or any combination thereof. An example memory controller 415 may also be used with the processor 410, or in some implementations, the memory controller 415 may be an internal part of the processor 410. In some examples, a plurality of microcontrollers and/or memory controllers may be used.

Depending on the desired configuration, the system memory 420 may be of any type, including but not limited to volatile memory (such as RAM), non-volatile memory (such as ROM, flash memory, etc.) or any combination thereof. System memory 420 may include an operating system 421, one or more applications 422, and program data 424. Application 422 may include at least one procedure with food processing commands/instructions 423, such as a procedure that controls directing one or more press bodies against food elements, directing an increase in a stiffness of a press surface of the one or more press bodies, and directing the one or more press bodies to advance and compress the food elements to produce a food aggregate. For example, the at least one procedure 423 for controlling and directing any of the systems or methods disclosed herein. Program data 424 may include information, data, etc. that is useful in the implementation of the application 422, such as information 425 that can be used to control the systems 100, 100*b*, or 100*d* of FIG. 1A-1C, 3A-3C, or 5, etc. In some examples, application 422 may be arranged to operate with program data 424 on an operating system 421 such that any of the procedures described herein may be performed. This described basic configuration is illustrated in FIG. 7 by those components within dashed line of the basic configuration 401.

Computing device 400 may have additional features or functionality, and additional interfaces to facilitate communications between the basic configuration 401 and any required devices and interfaces. For example, a bus/interface controller 440 may be used to facilitate communications between the basic configuration 401 and one or more storage devices 450 via a storage interface bus 441. The storage devices 450 may be removable storage devices 451, non-removable storage devices 452, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and non-volatile, removable and non-removable media implemented in any method or technology for storage of information, such as computer readable instructions, data structures, program modules, or other data.

System memory 420, removable storage 451 and non-removable storage 452 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 400. Any such computer storage media may be part of computing device 400.

Computing device 400 may also include an interface bus 442 for facilitating communication from various interface devices (e.g., output interfaces, peripheral interfaces, and communication interfaces) to the basic configuration 401 via the bus/interface controllers 440. Example output devices 460 include a graphics processing unit 461 and an audio processing unit 462, which may be configured to communicate to various external devices such as a display or speakers via one or more A/V ports 463. Example peripheral interfaces 470 include a serial interface controller 471 or a parallel interface controller 472, which may be configured to communicate with external devices such as input devices (e.g., keyboard, mouse, pen, voice input device, touch input device, etc.) or other peripheral devices (e.g., printer, scanner, etc.) via one or more I/O ports 473. An example communication device 480 includes a network controller 481, which may be arranged to facilitate communications with one or more other computing devices 490 over a network communication link via one or more communication ports 482.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 400 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 400 may also be implemented as a personal computer including both laptop computer and non-laptop computer configurations.

FIG. 7 is a block diagram illustrating an example computer program product 500 that is arranged to store instructions for controlling any of the systems disclosed herein, arranged in accordance with at least some of the examples of the present disclosure. The signal bearing medium 502 which may be implemented as or include a computer-readable medium 506, a recordable medium 508, a communications medium 510, or combinations thereof, stores programming instructions 504 that may configure the processing unit to perform all or some of the processes previously described. For example, instructions may include directing a food-element dispenser to dispense the food elements into one or more cavities for compression (e.g., as described above). Moreover, the programming instructions 504 may configure the processing unit to direct a press body, such that the first press surface presses against the food elements in a manner that reconfigures the first press surface to conform to one or more shapes of the food elements contacting the first press surface (e.g., to direct one or more valves on a hydraulic system that advances the press body, to direct one or more motors to advance the press body, etc.). The programming instructions 504 may configure the processing unit to direct increase in the stiffness of the first press surface (e.g., as described above, by applying vacuum to one or more press bodies). Furthermore, programming instructions 504 may configure the processing unit to direct the press body to advance and to compress the food elements to produce the food aggregate (e.g., as described above).

As would be understood by those skilled in the art, flexural strength (i.e., modulus of rupture) is a material property defined as the stress in a material before it yields (i.e., fractures, deforms, bends). Ultimate flexural stress (σ) or strength is defined as:

$$\sigma = 3FL/(2bd^2) \quad (1)$$

where F is the maximum load sustained before fracture, L is the length of the test span, b is the width of the specimen, and d is the thickness of the specimen.

Figure 8:
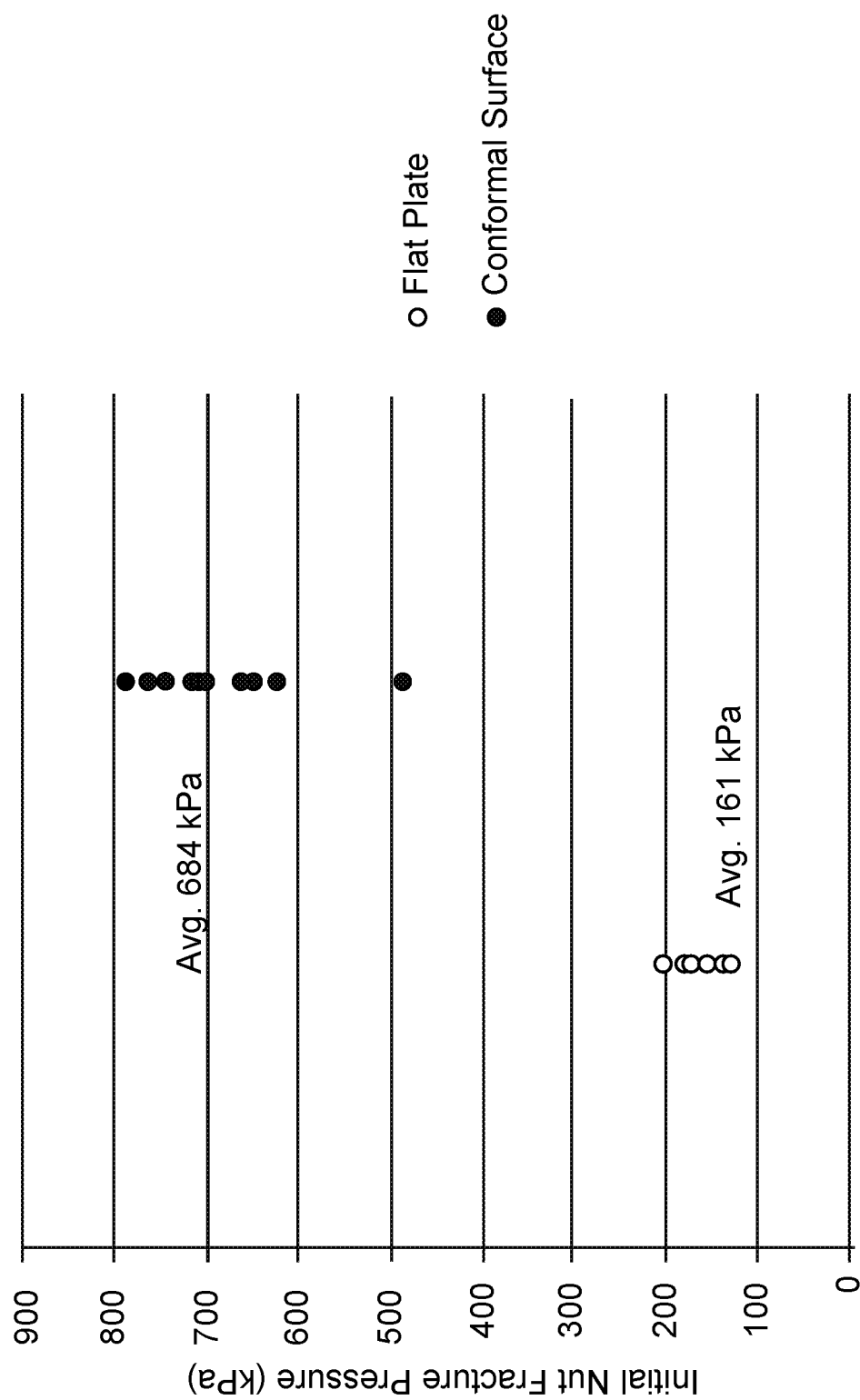
FIG. 8 illustrates a plot of initial food element fracture pressure between a flat press surface and a conformal press surface.

FIG. 8 illustrates a plot of initial food element fracture pressure (i.e., ultimate flexural stress) between a flat press surface and a conformal press surface (i.e., similar to first press body 120 as shown in FIGS. 1A-C). Food aggregates (i.e., bars) of an equal binder percentage (by weight), e.g., 25%, were pressed. Bond strength (i.e., binding strength) was determined by a three-point bend flexural strength test over a 6 cm span with a strain rate of 1 mm/sec. The ultimate flexural stress (σ) was calculated based on the above equation (1).

As shown in FIG. 8, a bar formed by a conformal press surface has a higher initial fracture pressure (i.e., ultimate flexural stress) than a bar formed by a flat (i.e., rigid) press surface. For example, the average initial fracture pressure for a bar formed by a conformal press surface (i.e., first press body 120 as shown in FIGS. 1A-C) with a 25% by weight binder (e.g., glucose syrup mixture) is about 684 kPa. For example, the average initial fracture pressure for a bar formed by a flat press surface (i.e., steel plate) with a 25% by weight binder (e.g., glucose syrup mixture) is about 161 kPa. In some embodiments, first press body 120 can apply about 150 kPa to about 800 kPa of pressure to multiple-food-element batch 10 to form food item 20. In some embodiments, first press body 120 can apply about 300 kPa to about 750 kPa of pressure to multiple-food-element batch 10 to form food item 20. For example, first press body 120 can apply about 600 kPa to 700 kPa of pressure.

Figure 9:
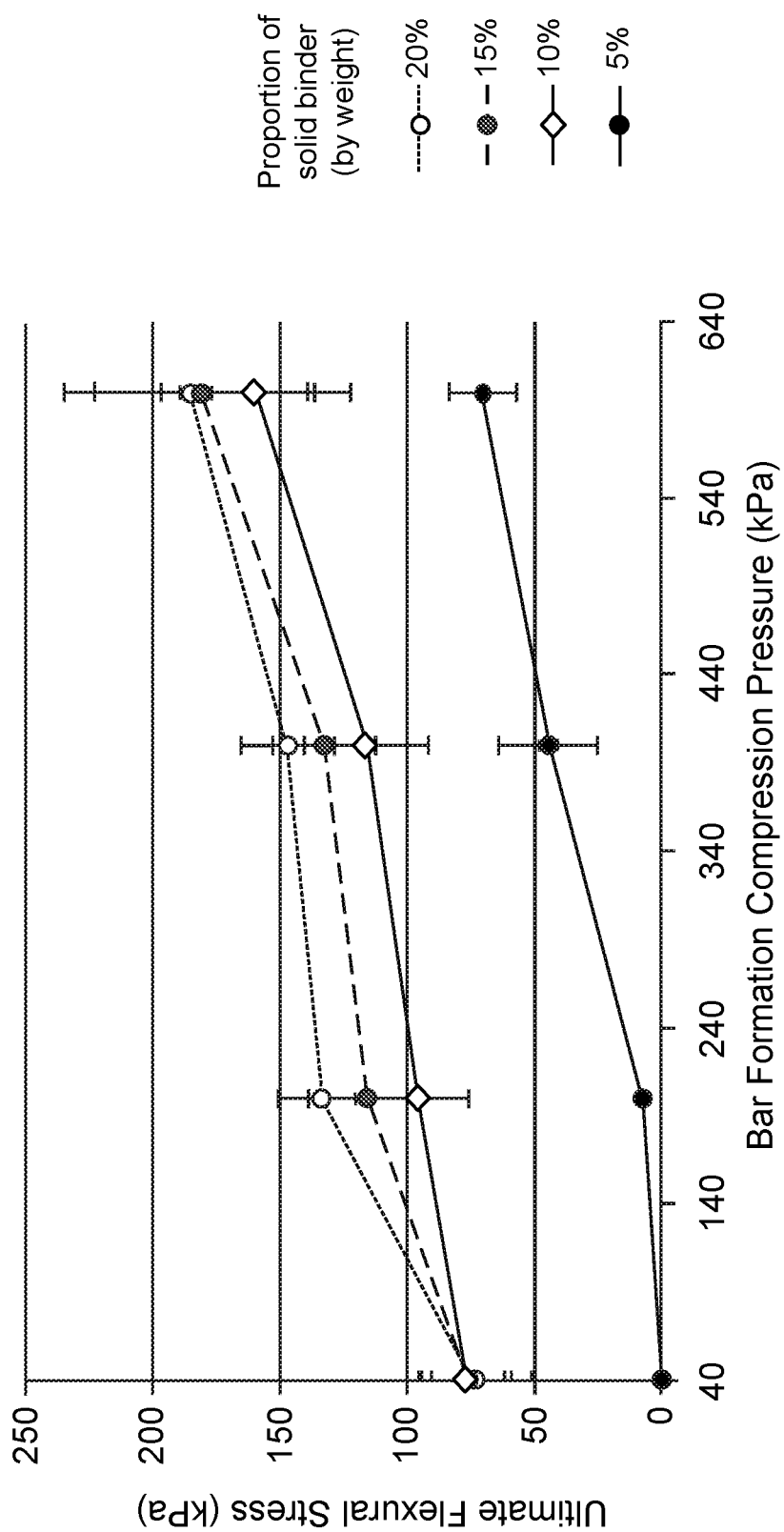
FIG. 9 illustrates a plot of ultimate flexural stress as a function of food aggregate compression pressure for various binder percentages (by weight).

FIG. 9 illustrates a plot of ultimate flexural stress as a function of food aggregate compression pressure for various binder percentages (by weight) for a conformal press surface (i.e., similar to first press body 120 as shown in FIGS. 1A-C). Food aggregates (i.e., bars) of different binder percentage (by weight), e.g., 5%, 10%, 15%, and 20%, were pressed at 40 kPa, 200 kPa, 400 kPa, and 600 kPa. Ten bars were pressed for each corresponding pressure and binder percentage. Bond strength (i.e., binding strength) was determined by a three-point bend flexural strength test over a 6 cm span with a strain rate of 1 mm/sec. The ultimate flexural stress (σ) was calculated based on the above equation (1).

As shown in FIG. 9, a conformal press surface can produce bars of high flexural strength, even with lower binder percentage (by weight). For example, the ultimate flexural stress for a bar formed by a conformal press surface (i.e., first press body 120 as shown in FIGS. 1A-C) with a 15% by weight binder (e.g., glucose syrup mixture) is about 175 kPa. In some embodiments, first press body 120 can apply about 150 kPa to 640 kPa of pressure to multiple-food-element batch 10 with a binder percentage (by weight) of about 20% or less to form food item 20. For example, first press body 120 can apply about 340 kPa to 640 kPa of pressure to multiple-food-element batch 10 with a binder percentage (by weight) of about 10% or less to form food item 20.

Figure 10:
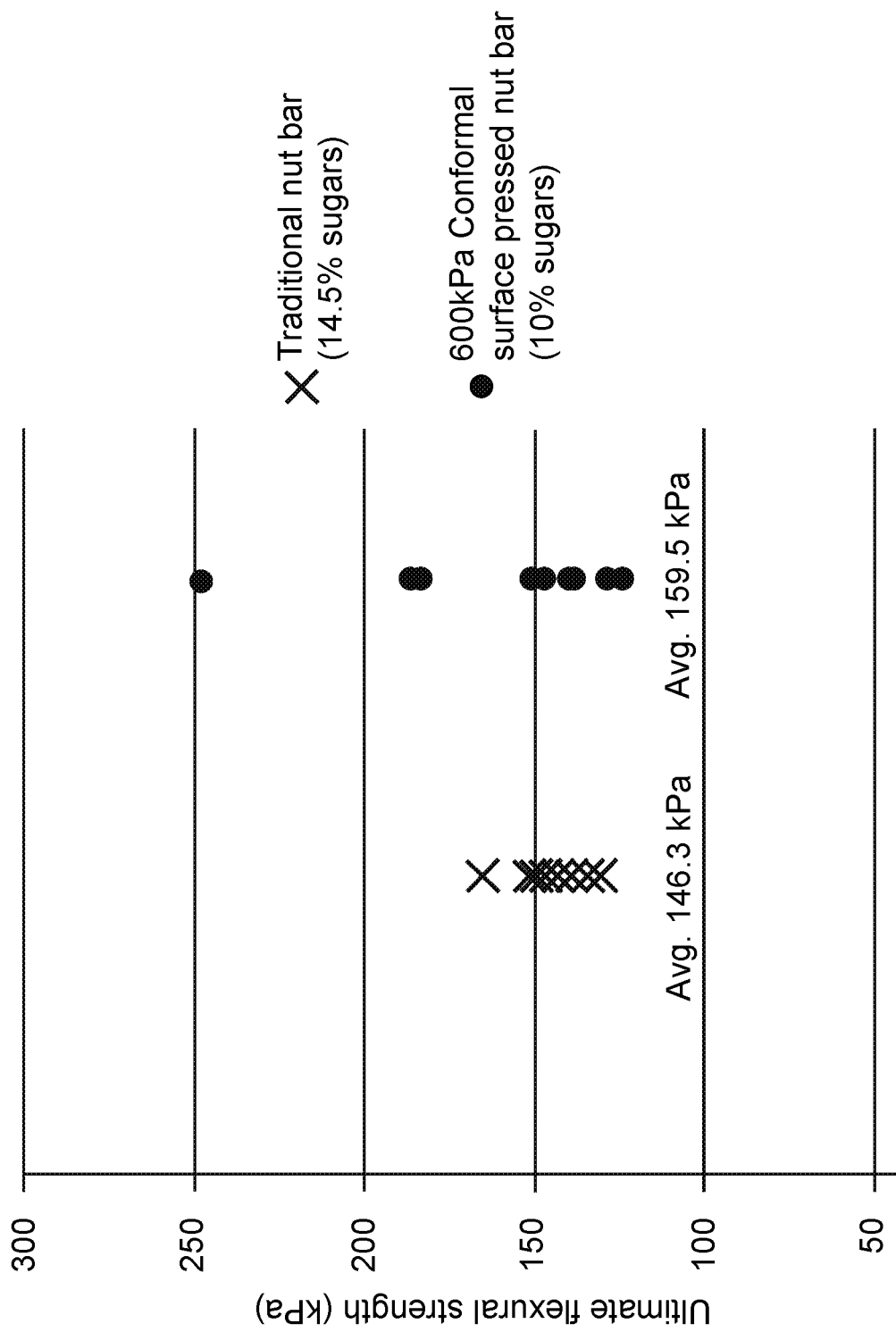
FIG. 10 illustrates a plot of ultimate flexural strength between a food aggregate made by a flat press surface and a food aggregate made by a conformal press surface.

FIG. 10 illustrates a plot of ultimate flexural strength (i.e., stress) between a food aggregate made by a flat press surface and a food aggregate made by a conformal press surface (i.e., similar to first press body 120 as shown in FIGS. 1A-C). Food aggregates (i.e., bars) of a similar binder percentage (by weight), e.g., 10%, of traditional food aggregates (e.g., 14.5 wt %) were formed. Ten bars were pressed at 600 kPa with a conformal press and compared to ten bars of a traditional food aggregate product (i.e., a current commercial product). Bond strength (i.e., binding strength) was determined by a three-point bend flexural strength test over a 6 cm span with a strain rate of 1 mm/sec. The ultimate flexural stress (σ) was calculated based on the above equation (1).

As shown in FIG. 10, the bars formed by a conformal press surface have a higher average ultimate flexural stress than the traditional bar formed by a flat (i.e., rigid) press surface. For example, the average ultimate flexural stress for a bar formed by a conformal press surface (i.e., first press body 120 as shown in FIGS. 1A-C) with a 10% by weight binder (e.g., glucose syrup mixture) is about 160 kPa. For example, the average ultimate flexural stress for a traditional bar formed by a flat press surface (i.e., steel plate) with a 14.5% by weight binder (e.g., glucose syrup mixture) is about 146 kPa. In some embodiments, first press body 120 can apply about 400 kPa to about 800 kPa of pressure to multiple-food-element batch 10 to form food item 20. In some embodiments, first press body 120 can apply about 500 kPa to about 700 kPa of pressure to multiple-food-element batch 10 to form food item 20. For example, first press body 120 can apply about 600 kPa of pressure to multiple-foodelement batch 10 with a binder percentage (by weight) of about 10% to form food item 20 with an ultimate flexural strength of about 160 kPa.

Figure 11A:
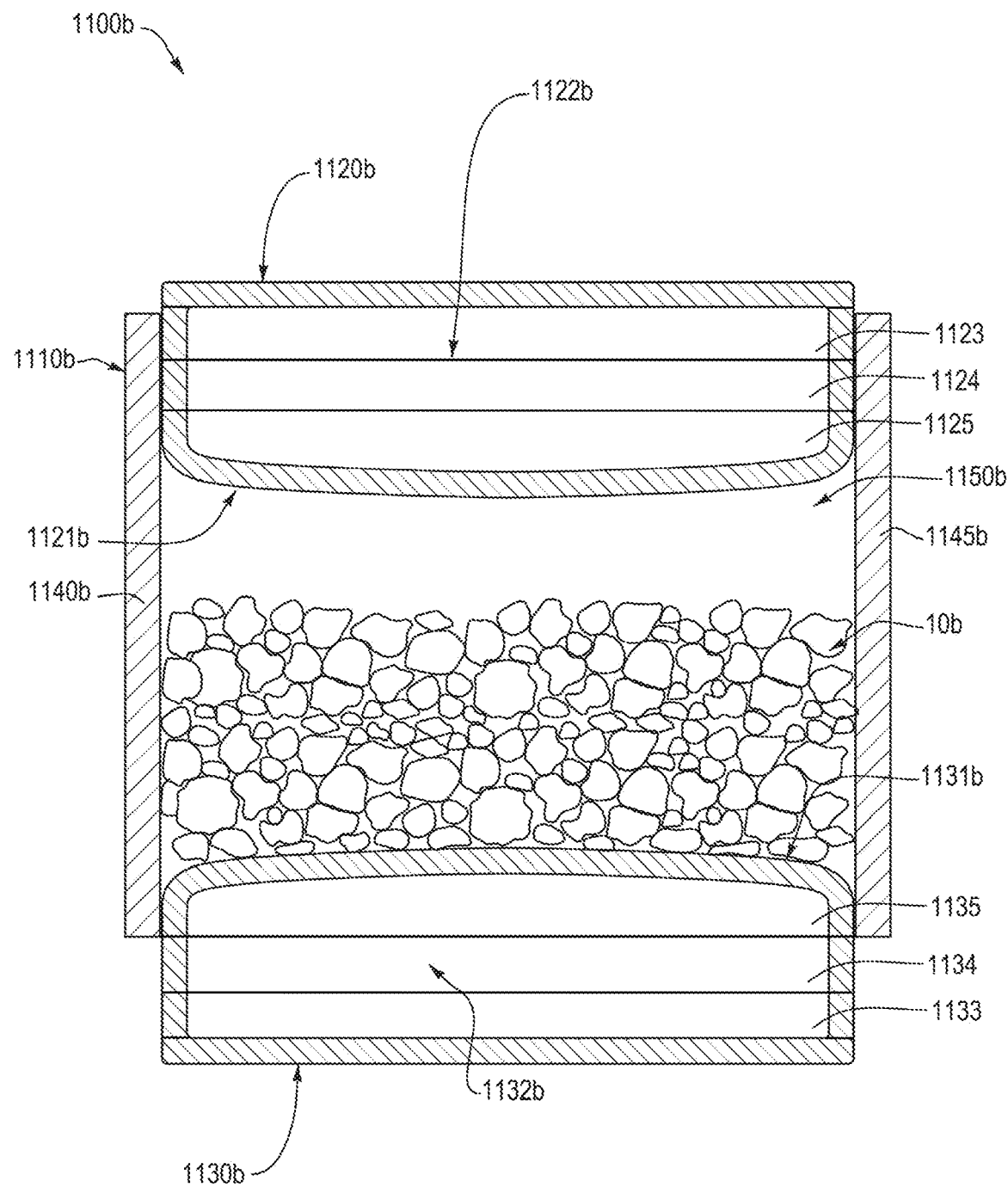
FIG. 11A is a schematic, cross-sectional view of a food-processing cell with press surfaces at a first distance therebetween, according to an embodiment.

FIG. 11A is a schematic, cross-sectional view of an alternative embodiment of food-element processing system 100. Food-element processing system 1100b is similar to food-element processing system 100 as shown in FIGS. 1A-1C and food-element processing system 100b as shown in FIGS. 3A-3C. Generally, except as described herein, food-element processing system 1100b and its elements and components may be similar to or the same as the food-element processing system 100 (shown in FIGS. 1A-1C) and its respective elements and components or the food-element processing system 100b (shown in FIGS. 3A-3C) and its respective elements and components.

For example, as shown in FIG. 11A, the food-element processing system 1100b may include a first press body 1120b, second press body 1130b, and sidewalls 1140b, 1145b, which collectively define a compression space 1150b. In the illustrated example, the first press body 1120b includes a first press surface 1121b. In certain embodiments, first press body 1120b may include a density gradient 1122b. For example, first press body 1120b may include a material having density gradient 1122b. In certain embodiments, first press body 1120b may include one or more layers. For example, first press body 1120b may include a first layer 1125, a second layer 1124, and a third layer 1123. In some embodiments, first layer 1125, second layer 1124, and third layer 1123 may be different materials. As shown in FIG. 11A, first layer 1125 may have a first density and include first press surface 1121b. First layer 1125 may be disposed between multiple-food-element batch 10b and second layer 1124. Second layer 1124 may have a second density which is higher than the first density of first layer 1125. Third layer 1123 may have a third density which is higher than the second density of second layer 1124. Second layer 1124 may be disposed between first layer 1125 and third layer 1123. The first, second, and third layers 1125, 1124, 1123 may be combined into a cohesive first press body 1120b which has density gradient 1122b. Density gradient 1122b may increase along an axis substantially perpendicular to and extending away from multiple-food-element batch 10b, for example, an axis parallel to sidewalls 1140b, 1145b.

In some embodiments, first press surface 1121b may be deformable or conformable, to conform to the food elements that define the upper side 11 (as also shown in FIGS. 1A-1C) of the multiple-food-element batch 10b. For example, first density of first layer 1125 and first press surface 1121b may be configured to deform or contour around multiple-food-element batch 10b when coming into contact with multiple-food-element batch 10b.

The first press body 1120b may include any number of suitable materials. For example, first press body 1120b may include rubber, foam, foam rubber, silicone, neoprene, nitrile, latex, vitrile, vinyl, other suitably pliable or deformable materials and/or non-porous materials, or combinations thereof. Moreover, the thickness of first layer 1125, with first press surface 1121b, may be suitable for conforming first press surface 1121b to the food elements of the multiple-food-element batch 10 (e.g., such that first press surface 1121b and/or first layer 1125 may bend, deform, and/or fold in a manner that at least conforms to and/or at least partially surrounds the food elements in contact therewith. As described below in more detail, first press body 1120b, including first layer 1125, second layer 1124, and third layer 1123, may include compressible material or compression-deformable material that may be softer than the food elements of the multiple-food-element batch 10 (e.g., the material of the first press surface 1121b may be compressed by a selected amount or percentage responsive to the forces between the first press surface 1121b and the food elements of the multiple-food-element batch 10 without extensively damaging or substantially without damaging the food elements). In some embodiments, first press body 1120b includes a backing, for example, a metal (e.g., steel, aluminum) backing. In some embodiments, a second press body 1130b is a flat press. For example, second press body 1130b may be a metal press (e.g., steel, aluminum, etc.).

Additionally or alternatively, a second press body 1130b, similar to first press body 1120b, may include a conformable press surface second press surface 1131b that may at least partially conform to one or more shapes and/or sizes of the food ingredients that define a bottom side of the multiple-food-element batch 10b. In some embodiments, second press body 1130b may have a similar configuration to second press body 130 (shown in FIGS. 1A-1C).

In the illustrated example, the second press body 1130b includes a second press surface 1131b. Furthermore, the second press body 1130b may include a density gradient 1132b. For example, second press body 1130b may include a material having density gradient 1132b. In some embodiments, second press body 1130b may include one or more layers. For example, second press body 1130b may include a first layer 1135, a second layer 1134, and a third layer 1133. In some embodiments, first layer 1135, second layer 1134, and third layer 1133 may be different materials. As shown in FIG. 11A, first layer 1135 may have a first density and include second press surface 1131b. First layer 1135 may be disposed between multiple-food-element batch 10b and second layer 1134. Second layer 1134 may have a second density which is higher than the first density of first layer 1135. Third layer 1133 may have a third density which is higher than the second density of second layer 1134. Second layer 1134 may be disposed between first layer 1135 and third layer 1133. The first, second, and third layers 1135, 1134, 1133 may be combined into a cohesive second press body 1130b which has density gradient 1132b. Density gradient 1132b may increase along an axis substantially perpendicular to and extending away from multiple-food-element batch 10b, for example, an axis parallel to sidewalls 1140b, 1145b.

In some embodiments, second press surface 1131b may be deformable or conformable, to conform to the food elements that define the bottom side of the multiple-food-element batch 10b. For example, first density of first layer 1135 and second press surface 1131b may be configured to deform or contour around multiple-food-element batch 10b.

The second press body 1130b may include any number of suitable materials. For example, second press body 1130b may include rubber, foam, foam rubber, silicone, neoprene, nitrile, latex, vitrile, vinyl, other suitably pliable or deformable materials and/or non-porous materials, or combinations thereof. Moreover, the thickness of first layer 1135, with second press surface 1131b, may be suitable for conforming second press surface 1131b to the food elements of the multiple-food-element batch 10 (e.g., such that second press surface 1131b and/or first layer 1135 may bend, deform, and/or fold in a manner that at least conforms to and/or at least partially surrounds the food elements in contact therewith. As described below in more detail, second press body 1130b, including first layer 1135, second layer 1134, and third layer 1133, may include compressible material or compression-deformable material that may be softer than the food elements of the multiple-food-element batch 10 (e.g., the material of the second press surface 1131*b* may be compressed by a selected amount or percentage responsive to the forces between the second press surface 1131*b* and the food elements of the multiple-food-element batch 10 without extensively damaging or substantially without damaging the food elements). In some embodiments, second press body 1130*b* includes a backing, for example, a metal (e.g., steel, aluminum) backing. In some embodiments, a second press body 1130*b* is a flat press. For example, second press body 1130*b* may be a metal press (e.g., steel, aluminum, etc.).

Figure 11B:
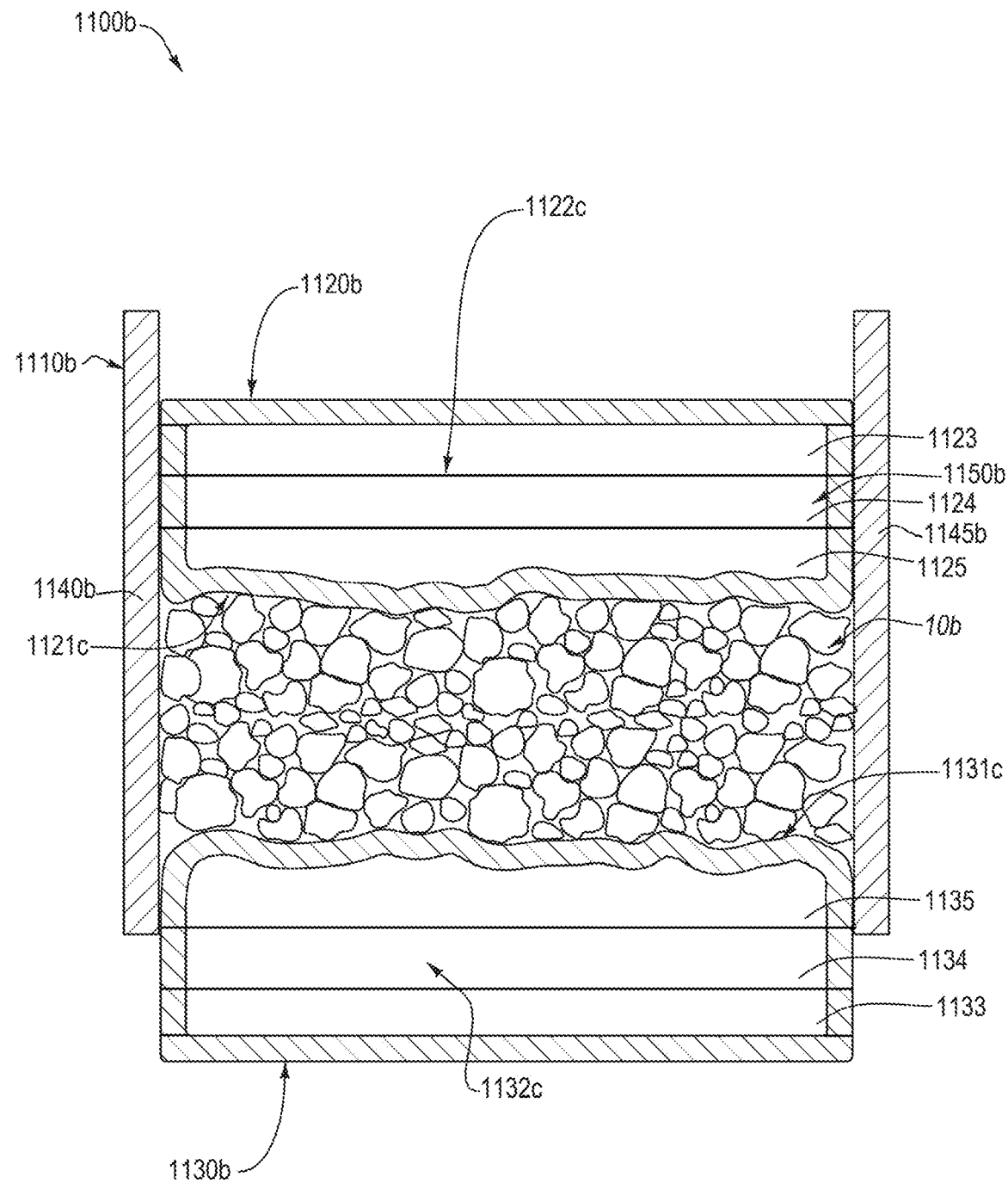
FIG. 11B is a schematic, cross-sectional side view of the food-processing cell of FIG. 11A with press surfaces at a second distance therebetween and a first press surface and a second press surface reconfigured to at least partially conform to one or more food elements located in the food-processing cell.

As discussed above, the conformable press surfaces of the food-processing cell may be pressed against the food elements in a manner that deforms the conformable press surfaces about the food elements. For example, the first press surface 1121*b* and second press surface 1131*b* (with corresponding density gradient 1122*b* and density gradient 1132*b*) may be reconfigured to at least partially conform to the respective upper and bottom sides of the multiple-food-element batch 10*b*, to form the respective conformed first press surface 1121*c* and conformed second press surface 1131*c* (and first layer 1125 and first layer 1135), as shown in FIG. 11B. In some examples, first press body 1120*b* may be advanced toward second press body 1130*b*. Additionally or alternatively, second press body 1130*b* may be advanced toward first press body 1120*b*. In each instance, a distance between first press body 1120*b* and second press body 1130*b* may be reduced in a manner that presses first press surface 1121*b* of first layer 1125 and second press surface 1131*b* of first layer 1135 to form the conformed first press surface 1121*c* and conformed second press surface 1131*c* (as shown in FIG. 11A).

In some examples, the food-processing cell 1110*b* includes sidewalls 1140*b*, 1145*b*. Hence, as the distance between first press body 1120*b* and second press body 1130*b* is reduced, the food elements of the multiple-food-element batch 10*b* are constrained by the sidewalls 1140*b*, 1145*b* (e.g., from being pushed outward), such that the advancement of the first press body 1120*b* and/or second press body 1130*b* forms the conformed first press surface 1121*c* and conformed second press surface 1131*c* (e.g., as shown FIG. 11B). It should also be appreciated that the sidewalls 1140*b* and/or 1145*b* may have similar configurations as the first press body 1120*b* and/or second press body 1130*b* (e.g., the sidewalls 1140*b* and/or 1145*b* may be conformable to the food elements of the multiple-food-element batch 10*b*). Moreover, the space or volume defined by the first press body 1120*b*, second press body 1130*b* and by the sidewalls 1140*b* and 1145*b* may have any number of suitable shapes and/or sizes, which may vary from one embodiment to another (e.g., such as to form any number of suitable shapes of the food item, which may have any number of sides formed or defined by undeformed food elements).

In some examples, the conformed first press surface 1121*c* and/or conformed second press surface 1131*c* may be a low density material. For example, first layer 1125 and first layer 1135 may be a soft low density foam rubber configured to conform to the shapes of the food elements of the multiple-food-element batch 10*b*.

Figure 11C:
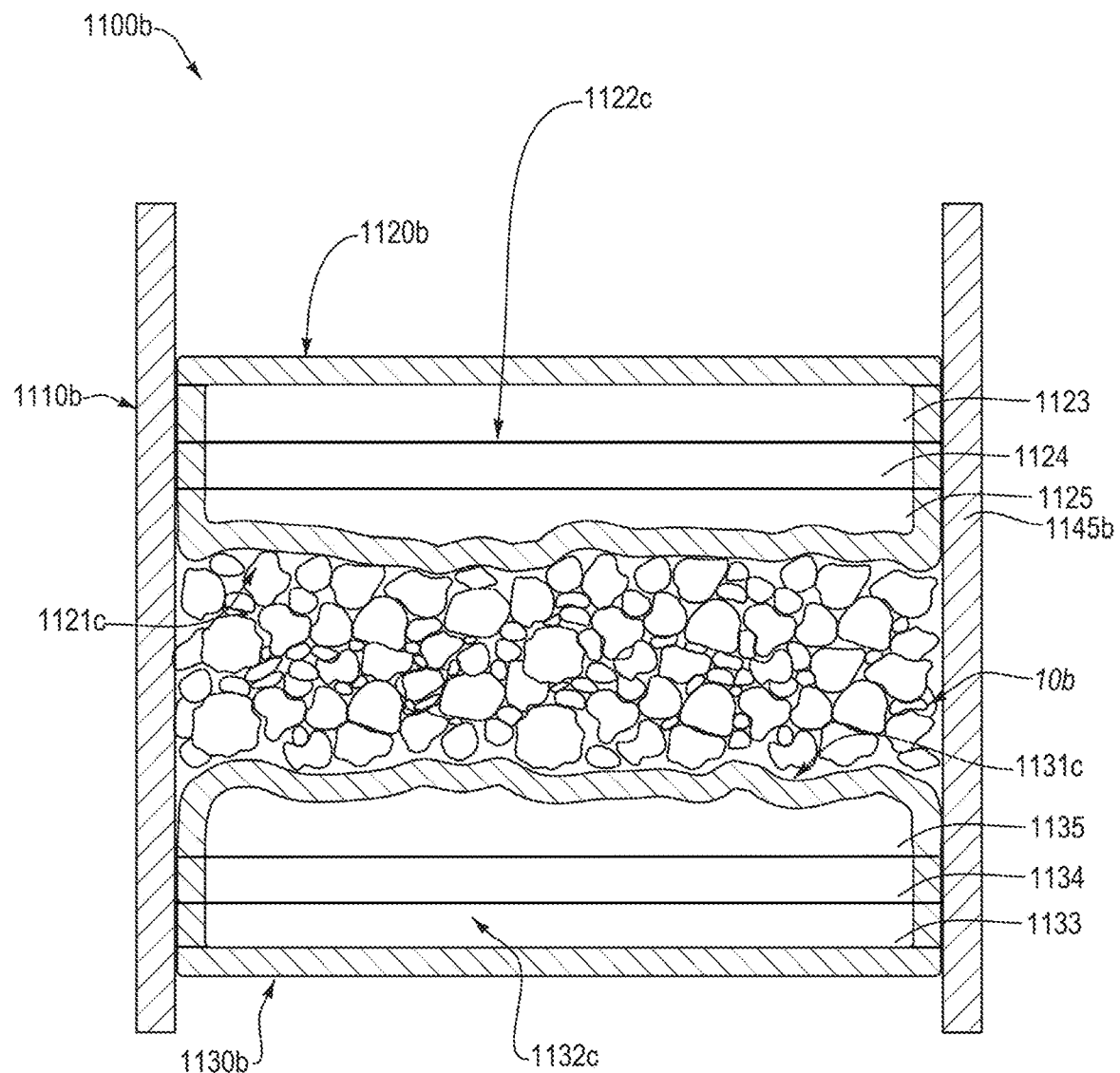
FIG. 11C is a schematic, cross-sectional side view of the food-processing cell of FIG. 11A with press surfaces at a third distance therebetween and the food elements being compressed in the food-processing cell.

Moreover, as shown in FIG. 11C, for example, after the conformed first press surface 1121*c* and/or conformed second press surface 1131*c* are suitably stiffened as a result of pressure, the first press body 1120*b* and second press body 1130*b* may further compress together the food elements to produce food item 20*b* (e.g., as shown in FIG. 4). After the food item 20*b* is produced (e.g., after the food elements are suitably compressed together to bond one to another in a manner that forms a single unit or food item 20*b* (e.g., as shown in FIG. 4)), the food item 20*b* may be released or dispensed from the food-processing cell 1110*b*. For example, the food item 20*b* may be released onto a conveyor belt or may be otherwise dispensed for further processing (e.g., packaging, etc.). As described above, compressing the multiple-food-element batch 10*b* and producing the food item 20*b* may be performed repeatedly or cyclically, so that the food-processing cell 1110*b* is operated to receive new multiple-food-element batch 10*b* after producing the food item 20*b*.

The present disclosure is not to be limited in terms of the particular examples described in this application, which are intended as illustrations of various aspects. Many modifications and examples can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and examples are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular examples only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to examples containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 items refers to groups having 1, 2, or 3 items. Similarly, a group having 1-5 items refers to groups having 1, 2, 3, 4, or 5 items, and so forth.

While the foregoing detailed description has set forth various examples of the devices and/or processes via the use of block diagrams, flowcharts, and/or examples, such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one example, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the examples disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. For example, if a user determines that speed and accuracy are paramount, the user may opt for a mainly hardware and/or firmware vehicle; if flexibility is paramount, the user may opt for a mainly software implementation; or, yet again alternatively, the user may opt for some combination of hardware, software, and/or firmware.

In addition, those skilled in the art will appreciate that the mechanisms of the subject matter described herein are capable of being distributed as a program product in a variety of forms, and that an illustrative example of the subject matter described herein applies regardless of the particular type of signal bearing medium used to actually carry out the distribution. Examples of a signal bearing medium include, but are not limited to, the following: a recordable type medium such as a floppy disk, a hard disk drive (HDD), a Compact Disc (CD), a Digital Video Disk (DVD), a digital tape, a computer memory, etc.; and a transmission type medium such as a digital and/or an analog communication medium (e.g., a fiber optic cable, a waveguide, a wired communication link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

While various aspects and examples have been disclosed herein, other aspects and examples will be apparent to those skilled in the art. The various aspects and examples disclosed herein are for purposes of illustration and are not intended to be limiting, with the true scope and spirit being indicated by the following claims.

It is to be understood that the phraseology or terminology herein is for the purpose of description and not of limitation, such that the terminology or phraseology of the present specification is to be interpreted by those skilled in relevant art(s) in light of the teachings herein.

The above examples are illustrative, but not limiting, of the embodiments of this disclosure. Other suitable modifications and adaptations of the variety of conditions and parameters normally encountered in the field, and which would be apparent to those skilled in the relevant art(s), are within the spirit and scope of the disclosure.

While specific embodiments of the disclosure have been described above, it will be appreciated that the disclosure may be practiced otherwise than as described. The descriptions above are intended to be illustrative, not limiting. Thus it will be apparent to one skilled in the art that modifications may be made to the disclosure as described without departing from the scope of the claims set out below.

It is to be appreciated that the Detailed Description section, and not the Summary and Abstract sections, is intended to be used to interpret the claims. The Summary and Abstract sections may set forth one or more but not all exemplary embodiments contemplated by the inventor(s), and thus, are not intended to limit the embodiments and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein.

The breadth and scope of the present disclosure should not be limited by any of the above-described exemplary embodiments, but should be defined only in accordance with the following claims and their equivalents.

What is claimed is:

1. A system to fabricate a food aggregate from food elements, the system comprising:
   a first press body;
   a container having an outer surface such that at least a portion of the outer surface of the container defines a second press body positioned and oriented opposite to the first press body, the second press body being reconfigurable from a first configuration to a second, non-planar configuration differing from the first configuration; and
   a pressure regulator operably coupled to the container and configured to selectively reduce or increase pressure in the container;
   wherein at least one of the first press body or the second press body is configured to compress the food elements and form the food aggregate.

2. The system of claim 1, wherein the second press body comprises a first layer having a first density and a second layer having a second density, wherein the first layer is disposed between the food elements and the second layer.

3. The system of claim 2, wherein the second density is higher than the first density.

4. The system of claim 2, wherein the second press body comprises a third layer having a third density, wherein the second layer is disposed between the first layer and the third layer.

5. The system of claim 4, wherein the second density is higher than the first density and the third density is higher than the second density.

6. The system of claim 1, further comprising a vacuum source operably coupled to the pressure regulator.

7. The system of claim 1, further comprising a piston operably connected to the first press body or to the second press body and movable in a manner that decreases space between the first press body and second press body.

8. The system of claim 7, further comprising a controller operably coupled to the piston and to the pressure regulator and configured to:
   direct movement of the piston in a manner that decreases separation between the first press body and the second press body, thereby reconfiguring the second press body from the first configuration to the second, non-planar configuration responsive to a first pressure applied by the second press body and the first press body on the food elements therebetween; and
   after movement of the piston, direct the pressure regulator to reduce pressure in the container.

9. The system of claim 8, wherein the controller is configured to direct the piston to produce a second pressure applied by the first press body and the second press body on the food elements therebetween, the second pressure being greater than the first pressure.

10. A system to fabricate a food aggregate from food elements, the system comprising:
    a plurality of compression cells including a plurality of walls that partially define a plurality of compression spaces;
    one or more first press bodies positioned within at least one compression space of the plurality of compression spaces;
    one or more second press bodies positioned and oriented opposite to at least one first press body of the one or more first press bodies, the one or more second press bodies being configured to compress the food elements and form the food aggregate;
    one or more containers, each including an outer surface at least a portion of which defines at least one of the one or more first press bodies or one or more second press bodies; and
    one or more pressure regulators operably coupled to the one or more containers and configured to selectively reduce or increase the pressure in the one or more containers;

wherein at least one of the one or more first press bodies or the one or more second press bodies is reconfigurable from a first configuration to a second, non-planar configuration that is different from the first configuration.

11. The system of claim 10, further comprising:
one or more containers, each including an outer surface at least a portion of which defines at least one of the one or more first press bodies or one or more second press bodies; and
one or more pressure regulators operably coupled to the one or more containers and configured to selectively reduce or increase the pressure in the one or more containers.

12. The system of claim 11, further comprising one or more vacuum sources operably coupled to the one or more pressure regulators.

13. The system of claim 11, further comprising a particulate medium disposed in the one or more containers.

14. The system of claim 11, wherein each container of the plurality of containers includes at least one flexible wall that defines at least one of the one or more first press bodies or one or more second press bodies.

15. The system of claim 11, further comprising a piston operably connected to the first press body and movable in a manner that decreases space between the first press body and the second press body.

16. The system of claim 15, further comprising a controller operably coupled to the piston and to the pressure regulator and configured to:
direct movement of the piston in a manner that decreases space between at least one of the one or more first press bodies and at least one of the one or more second press bodies to a first distance, thereby reconfiguring one or more of the at least one first press body or at least one second press body from the first configuration to the second, non-planar configuration responsive to a first pressure applied by the at least one first press body and the at least one second press body on the food elements therebetween; and
after movement of the piston, direct the one or more pressure regulators to reduce pressure in at least one container of the one or more containers.

17. The system of claim 10, wherein the first press body is reconfigurable from a first configuration to a second, non-planar configuration, and the second, non-planar configuration of the press body is different from the first configuration.

18. The system of claim 10, wherein the at least one or more first press bodies or the one or more second press bodies comprises a material having a density gradient.

19. The system of claim 18, wherein the density increases along an axis substantially perpendicular to and extending away from the food elements.

20. A method to fabricate a food aggregate from food elements of one or more shapes, the method comprising:
positioning food elements between a first press body and a second press body;
pressing the first press body against the food elements in a manner to produce a first pressure on the food elements and that reconfigures the first press body to conform to one or more shapes of the food elements contacting the first press body;
increasing the stiffness of the first press body; and
compressing the food elements by pressing the reconfigured press body against the food elements to produce a second pressure on the food elements and to produce the food aggregate,
wherein the second pressure is greater than the first pressure.

21. The method of claim 20, wherein:
the first press body is defined by a container that includes a particulate medium; and
increasing the stiffness of the first press body comprises reducing the pressure in the container.

22. The method of claim 20, further comprising:
pressing the second press body against the food elements in a manner that reconfigures the second press body to conform to the one or more shapes of the food elements contacting the second press body; and
increasing the stiffness of the second press body.

23. The method of claim 20, wherein pressing the first press body against the food elements in the manner that reconfigures the first press body to conform to the one or more shapes of the food elements contacting the first press body comprises moving at least one of the first press body and the second press body in a manner that reduces a distance therebetween.

24. The method of claim 20, further comprising decreasing the stiffness of the first press body after compressing the food elements to produce the food aggregate.

25. The method of claim 20, wherein compressing the food elements comprises applying a pressure of about 150 kPa to about 800 kPa to produce the food aggregate.

* * * * *